(12) United States Patent
Nurishi et al.

(10) Patent No.: US 7,113,344 B2
(45) Date of Patent: Sep. 26, 2006

(54) ANAMORPHIC CONVERTER, LENS DEVICE USING THE SAME, AND IMAGE-TAKING DEVICE USING THE SAME

(75) Inventors: Ryuji Nurishi, Utsunomiya (JP); Takahiro Yoshimi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/050,391

(22) Filed: Feb. 3, 2005

(65) Prior Publication Data

US 2005/0168829 A1 Aug. 4, 2005

(30) Foreign Application Priority Data

Feb. 4, 2004 (JP) .............................. 2004-027496

(51) Int. Cl.
*G02B 13/08* (2006.01)

(52) U.S. Cl. ................. 359/668; 359/671; 359/672
(58) Field of Classification Search ........ 359/676–792, 359/668, 670, 671, 672–675
See application file for complete search history.

(56) References Cited

U.S. PATENT DOCUMENTS

| | | | |
|---|---|---|---|
| 3,751,136 A | 8/1973 | Kirchhoff K | |
| 5,307,084 A | 4/1994 | Yamag | |
| 5,668,666 A | 9/1997 | Suzuki | |
| 5,905,597 A * | 5/1999 | Mizouchi et al. | 359/671 |
| 6,995,920 B1 * | 2/2006 | Nurishi | 359/668 |

FOREIGN PATENT DOCUMENTS

| | | |
|---|---|---|
| JP | 2-13916 A | 1/1990 |
| JP | 3-25407 A | 2/1991 |
| JP | 5-188271 A | 7/1993 |
| JP | 6-82691 A | 3/1994 |
| JP | 2001-108899 A | 8/2001 |

* cited by examiner

*Primary Examiner*—Scott J. Sugarman
*Assistant Examiner*—Darryl J. Collins
(74) *Attorney, Agent, or Firm*—Canon U.S.A. Inc I.P. Div

(57) ABSTRACT

An anamorphic converter, which can be inserted into and removed from a lens group of an image-formation optical system, includes an anamorphic lens that satisfies the following conditions $$0.9 < (AR1 \cdot \beta x)/(AR2 \cdot \beta y) < 1.1$$

$$(AR2^2+1) \cdot \beta y^2/(AR1^2+1) > 1$$

wherein βx represents a first focal distance magnification scale at a first cross-section containing an optical axis of the anamorphic lens, βy represents a second focal distance magnification scale at a second cross-section which is perpendicular to the first cross-section and contains the optical axis, AR1 represents an aspect ratio of an image-taking range in a field of the image-formation optical system, and AR2 represents an aspect ratio at an effective range of an image-taking unit disposed at an object image side of the lens group. As such, there is provided an anamorphic converter which is small and has high optical performance, suitable for digital cinematography.

9 Claims, 17 Drawing Sheets

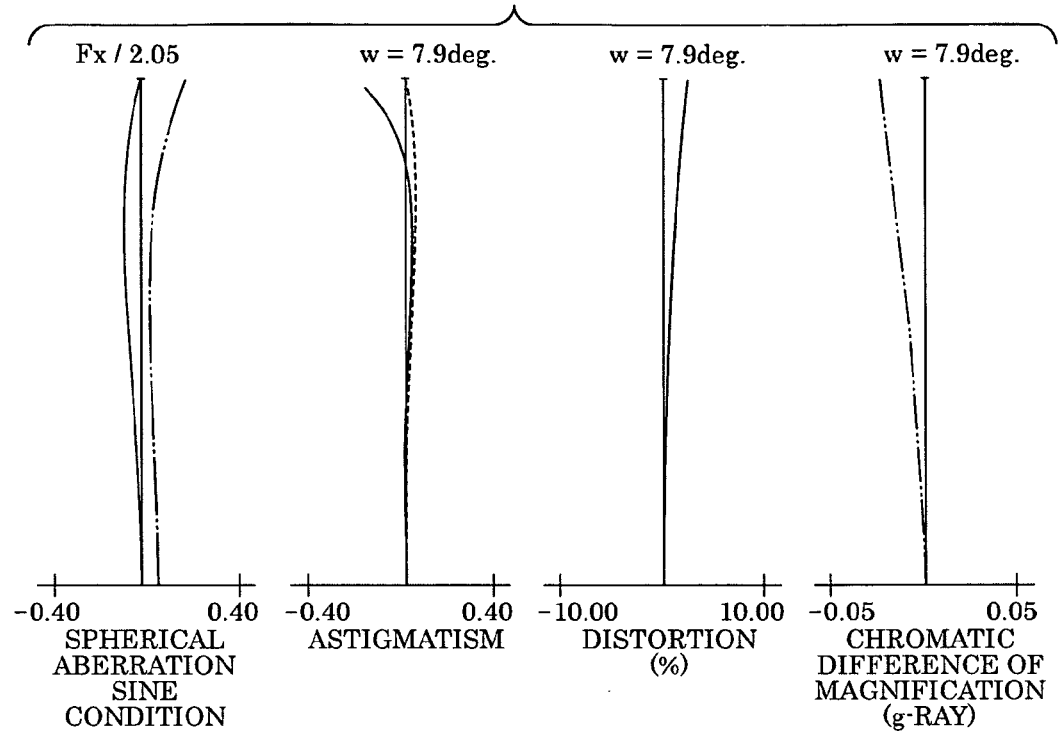
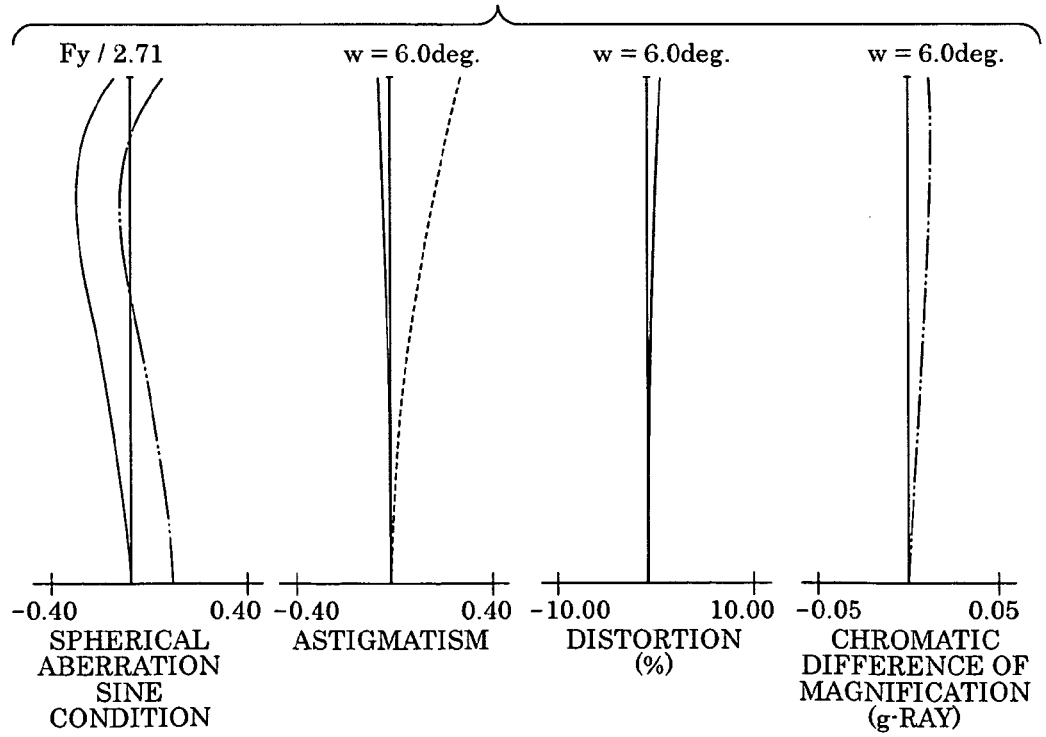

SPHERICAL ABERRATION | ASTIGMATISM | DISTORTION ABERRATION | CHROMATIC DIFFERENCE OF MAGNIFICATION

ANAMORPHIC CONVERTER, LENS DEVICE USING THE SAME, AND IMAGE-TAKING DEVICE USING THE SAME

BACKGROUND OF THE INVENTION

1. Field of the Invention

The present invention relates to an anamorphic converter used with image-taking devices such as film cameras, television cameras, video cameras, or the like, for taking pictures with an aspect ratio which differs from that of the imaging device.

2. Description of the Related Art

Various techniques for recording and playback of images with conversion of aspect ratio have been conventionally proposed. Particularly, in the field of cinematography, a technique is widely used with a CinemaScope format (aspect ratio 2.35:1) picture recording/playback system wherein the picture is optically horizontally compressed using an anamorphic lens so as to be taken on film, and also shown at the time of playback by optically horizontally expanding the image on film using an anamorphic lens.

Known anamorphic converters include front converters which are attached to the object side of an image-formation optical system, such as disclosed in Japanese Patent Laid-Open No. 2-13916 and Japanese Patent Laid-Open No. 6-82691, for example. These converters are simple and do not exhibit vignetting because they ensure a suitable effective diameter regardless of the conversion ratio. Also, with regard to such front converters, Japanese Patent Laid-Open No. 3-25407 and Japanese Patent Laid-Open No. 5-188271, for example, propose techniques for correcting astigmatism due to focus.

Also, with regard to a rear converter to be attached to the image side of an image-formation optical system, the arrangement described in Japanese Patent Publication 3,021,985 (corresponding U.S. Pat. No. 5,307,084) with reduced change in astigmatism due to focus is known. Further, there is known a converter, such as described in U.S. Pat. No. 5,668,666, having a built-in converter and capable of being detachably inserted to the image side of the focusing group of the image-formation optical system. This built-in converter also is capable of reducing change in astigmatism.

Now, in recent years, video technology has seen a trend toward higher definition, to where digital cinema systems wherein cinematography carried out using HDTV systems are becoming commonplace. While imaging devices having an aspect ratio of 16:9 (1.78:1) are common with digital cinema systems, there is demand for an anamorphic converter for improving image quality by effectively utilizing pixels on the imaging device side in order to shoot pictures in the 2.35:1 aspect ratio CinemaScope format. Prerequisites for a cinematography anamorphic converter are that suitable aspect ratio conversion is performed, that there is no vignetting, that the effective image field of the image-formation optical system can be fully utilized, that there is little drop in light quantity at the periphery, and that high optical capabilities can be had over the entire zooming/focusing range of the image-formation optical system.

Now, although the front converter disclosed in Japanese Patent Laid-Open No. 2-13916 and Japanese Patent Laid-Open No. 6-82691 are advantageous in being simple, and not exhibiting vignetting due to ensuring a suitable effective diameter regardless of the conversion ratio, however, further improvements are desired with regard to larger size and change in astigmatism due to focusing. Also, the arrangements disclosed in Japanese Patent Laid-Open No. 3-25407 and Japanese Patent Laid-Open No. 5-188271 enable correcting of astigmatism due to focus. However, correcting means within the converter must be driven synchronously with the focusing of the image-formation optical system, thereby necessitating a complicated mechanism.

Also, the rear converter disclosed in Japanese Patent Publication 3,021,985 is advantageous in that there is no change in astigmatism due to focusing, but there is the need to suitably set the horizontal and vertical conversion scaling to suppress vignetting, and improvement is desired regarding change in field angle of the image-formation optical system. Further, the built-in converter disclosed in U.S. Pat. No. 5,668,666 also is advantageous in that there is little change in astigmatism due to focusing, but has a problem in that angular magnification is smaller than 1, and vignetting occurs.

SUMMARY OF THE INVENTION

The present invention is directed to an anamorphic converter suitable for digital cinematography, small in size and having excellent optical performance.

According to a first aspect of the present invention, an anamorphic converter, which can be inserted into and removed from a lens group of an image-formation optical system, includes an anamorphic lens that satisfies the following conditions:

$$0.9 < (AR1 \cdot \beta x)/(AR2 \cdot \beta y) < 1.1$$

$$(AR2^2+1) \cdot \beta y^2 (AR1^2+1) > 1$$

$\beta x$ represents a first focal distance magnification scale at a first cross-section containing an optical axis of the anamorphic lens. $\beta y$ represents a second focal distance magnification scale at a second cross-section which is perpendicular to the first cross-section and contains the optical axis. AR1 represents an aspect ratio of an image-taking range in a field of the image-formation optical system, and AR2 represents an aspect ratio at an effective range of an image-taking unit disposed at an object image side of the lens group.

According to a second aspect of the present invention, an anamorphic converter disposed at an object side of an image-formation optical system includes at least two anamorphic lenses a1 and a2 positioned in order from the object side. The anamorphic lenses satisfying the following conditions:

$$\phi a1 > 0$$

$$\phi a2 < 0$$

$\phi a1$ and $\phi a2$ represent refractive powers of the anamorphic lens a1 and the anamorphic lens a2, at a first cross-section containing an optical axis of the anamorphic lenses and perpendicular to a second cross-section containing the optical axis.

According to the present invention, an anamorphic converter can be realized which is suitable for digital cinematography, and small in size and having excellent optical performance.

Further features and advantages of the present invention will become apparent from the following description of exemplary embodiments with reference to the attached drawings.

BRIEF DESCRIPTION OF THE DRAWINGS

FIG. 1A is a cross-sectional diagram illustrating a lens configuration in the Y direction with an anamorphic converter inserted, and FIG. 1B is a cross-sectional diagram illustrating the lens configuration in the X direction with the anamorphic converter inserted.

FIG. 15 is a diagram of longitudinal aberration in the X direction, in a numerical example according to the first embodiment wherein fx=39.5 mm, fy=52.1 mm, and object distance is 2.5 m.

FIG. 16 is a diagram of longitudinal aberration in the Y direction, in a numerical example according to the first embodiment wherein fx=39.5 mm, fy=52.1 mm, and object distance is 2.5 m.

FIG. 23A is a cross-sectional diagram illustrating the lens configuration in the X direction with an anamorphic converter inserted, and FIG. 23B being a cross-sectional diagram illustrating the lens configuration in the Y direction with the anamorphic converter inserted.

DESCRIPTION OF THE EMBODIMENTS

First Embodiment

Figure 2:
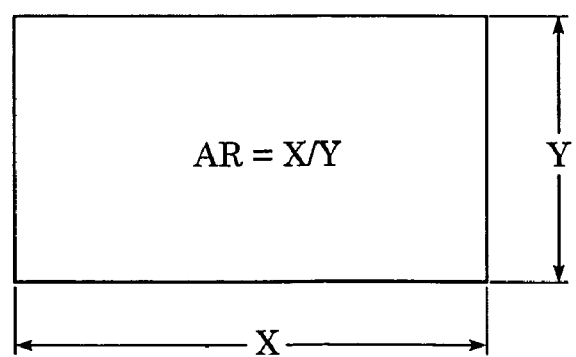
FIG. 2 is a conceptual diagram of aspect ratio, for describing the first embodiment of the present invention.
Figure 3:
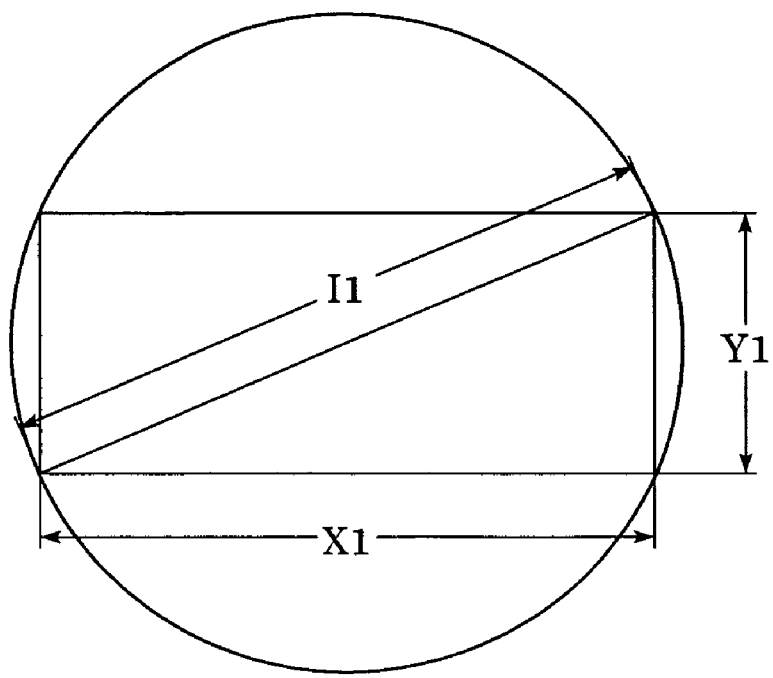
FIG. 3 is a conceptual diagram of an image circle and image-taking range in the field of an image-formation optical system according to the first embodiment of the present invention.
Figure 4:
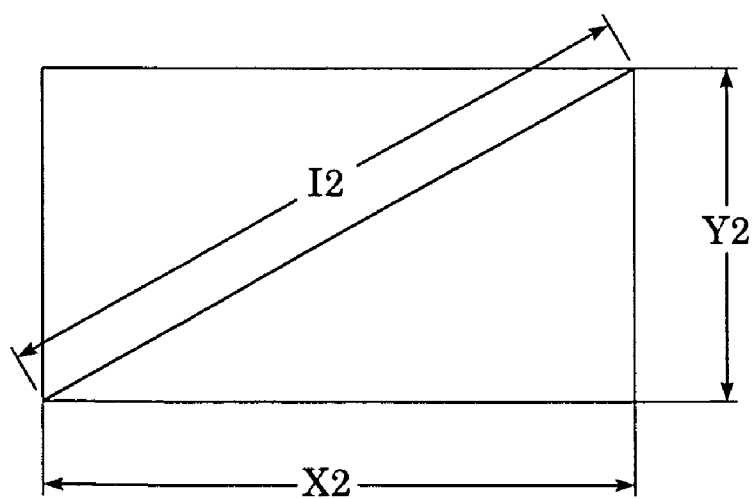
FIG. 4 is a conceptual diagram of an image circle and image-taking range following conversion by a converter, according to the first embodiment of the present invention.
Figure 5:
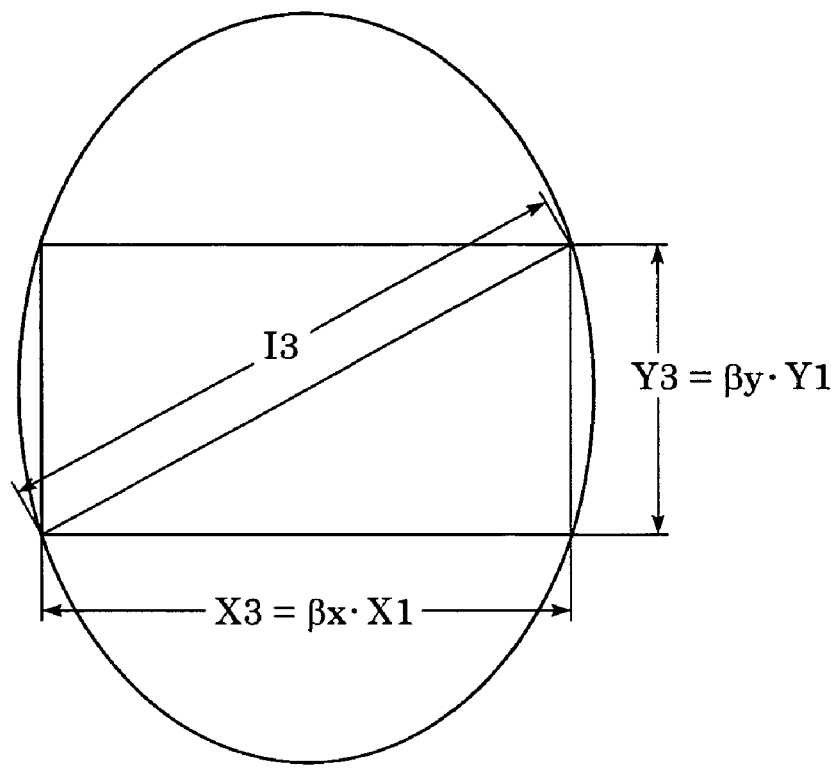
FIG. 5 is a conceptual diagram of the effective range of image-taking unit, according to the first embodiment of the present invention.
Figure 6:
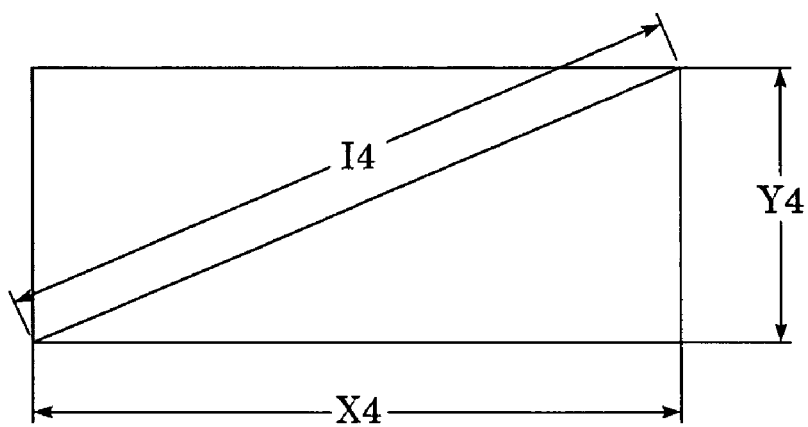
FIG. 6 is a conceptual diagram of the display region of the output image at the time of showing, according to the first embodiment of the present invention.

Next, description will be made regarding a first embodiment of an anamorphic converter which can be inserted into and detached from a lens group at the image side of an image-formation optical system (focusing lens group) F. FIG. 2 is a conceptual diagram of aspect ratio, for describing the present embodiment, FIG. 3 is a conceptual diagram of an image circle and image-taking range in the field of an image-formation optical system according to the present embodiment, FIG. 4 is a conceptual diagram of an image circle and image-taking range following conversion by a converter, according to the present embodiment, FIG. 5 is a conceptual diagram of the effective range of image-taking unit, according to the first embodiment of the present invention, and FIG. 6 is a conceptual diagram of the display region of the output image at the time of showing, according to the first embodiment of the present invention.

With the anamorphic converter according to the present embodiment, suitable aspect ratio conversion can be performed without vignetting, by means of appropriately stipulating conversion magnification with the following settings of conditions:

$$0.9 < (AR1 \cdot \beta x)/(AR2 \cdot \beta y) < 1.1 \tag{1}$$

$$(AR2^2+1) \cdot \beta y^2 /(AR1^2+1) > 1 \tag{2}$$

wherein $\beta x$ represents the focal distance magnification scale at an arbitrary cross-section X containing the optical axis of the anamorphic converter, $\beta y$ represents the focal distance magnification scale at a cross-section Y which is perpendicular to the cross-section X and contains the optical axis, AR1 represents the aspect ratio of the image-taking range in the field of the image-formation optical system, and AR2 represents the aspect ratio at the effective range of the image-taking unit. Expression (1) is the condition for executing suitable aspect ratio conversion.

With reference to FIG. 2, the aspect ratio AR is expressed as:

$$AR = X/Y \tag{5}$$

in which the horizontal length of the field is X and the vertical length of the field is Y.

FIG. 3 is a model diagram of the imaging range of the image-formation optical system, and FIG. 4 is a model diagram of the imaging range of the imaging unit. In FIG. 3, X1 is the horizontal length of effective screen dimensions of the imaging range for the field of the image-formation optical system, Y1 is the vertical length thereof, and AR1 is the aspect ratio thereof. X2 is the horizontal length for the imaging range of the imaging unit, Y2 is the vertical length thereof, and AR2 is the aspect ratio thereof. As such, the relation thereof is expressed as follows:

$$AR1/AR2 = (X1 \cdot Y2)/(X2 \cdot Y1) \tag{6}$$

Also, FIG. 5 is a conceptual diagram of the imaging range following aspect ratio conversion with the anamorphic converter. In order for suitable aspect ratio conversion to be performed, the conversion magnification $\beta x$ in the horizontal direction of the anamorphic converter and the conversion magnification $\beta y$ in the vertical direction can be expressed as follows:

$$\beta x = X2/X1 \tag{7}$$

$$\beta y = Y2/Y1 \tag{8}$$

According to Expressions (6) through (8), the condition for ideal aspect ratio conversion is as follows:

$$(AR1 \cdot \beta x)/(AR2 \cdot y) = 1 \tag{9}$$

In practice, a margin of error of about 10% is almost indiscernible visually, so that suitable aspect ratio conversion can be realized by satisfying Expression (1).

Expression (2) shows the conditions for preventing vignetting accompanying aspect ratio conversion. In a case of disposing the converter at the image side of the image-formation optical system, the image circle is restricted by the effective diameter of the image-formation optical system side, and accordingly a conversion magnification smaller than 1 does not yield a wide angle. Rather, vignetting occurs at the periphery of the image. The image circle I1 of the image-formation optical system shown in FIG. 3 is represented by the following:

$$I1 = (X1^2 + Y1^2)^{1/2} = Y1 \cdot (AR1^2+1)^{1/2} \tag{10}$$

Also, the diagonal length I2 of the imaging unit shown in FIG. 4 is represented by the following:

$$I2 = (X2^2 + Y2^2)^{1/2} = \beta y \cdot Y1 \cdot (AR2^2+1)^{1/2} \tag{11}$$

Further, the diagonal length I3 of the subjected to aspect ratio conversion with the anamorphic converter as shown in FIG. 5 is represented by the following:

$$I3 = \{(\beta x \cdot X1)^2 + (\beta y \cdot Y1)^2\}^{1/2} = \beta y \cdot Y1 \cdot (AR2^2+1)^{1/2} \tag{12}$$

Accordingly, I3>I2 must hold in order for the image following aspect ratio conversion to encompass the diagonal length of the imaging unit and to prevent vignetting. Hence, from Expressions (11) and (12), $$I3^2/I2^2 > 1 \tag{13}$$

Normally, the image circle I1 of the image formation optical system can be considered to be approximately equal to the diagonal length I2 of the imaging unit, and accordingly, $$I3^2/I1^2 > 1 \tag{13'}$$

and $$\{\beta y^2 \cdot (AR2^2+1)\}/(AR1^2+1) > 1 \tag{2}$$

FIG. 6 is a conceptual diagram of an output image at the time of showing. For projection, aspect ratio conversion opposite to that at the time of shooting must be performed, so as to return the aspect ratio to the original aspect ratio. Accordingly, the horizontal length X4 and vertical length Y4 in FIG. 6 can be respectively expressed by:

$$X4 = \beta x' \cdot X2 \tag{14}$$

$$Y4 = \beta y' \cdot Y2 \tag{15}$$

The conversion magnifications $\beta x'$ and $\beta y'$ can be respectively expressed by:

$$\beta x' = m/\beta x \tag{16}$$

$$\beta y' = m/\beta y \tag{17}$$

wherein m is an arbitrary constant.

Note that generally, the image circle of an image formation optical system changes depending on zooming, focusing, and aperture. The conditions given in Expression (2) are calculated based on conditions wherein the image circle is the smallest, enabling an arrangement wherein there is no vignetting even in the event that the left side of Expression (2) is smaller than 1 in the event that the image circle I1 can be ensured to be larger than the diagonal length I2 of the imaging unit by restricting the range of use of zooming, focusing, and aperture with the image-formation optical system.

Also, with the present configuration example, the configuration of the anamorphic converter for being removably inserted into the image-formation optical system for aspect ratio conversion can be suitably stipulated by setting conditions as:

$$\phi a1 > 0 \qquad (3)$$

$$\phi a2 < 0 \qquad (4)$$

wherein the anamorphic converter has at least two anamorphic lenses a1 and a2 in that order from the object side, and wherein $\phi a1$ and $\phi a2$ represent the refractive power at an arbitrary cross-section X containing the optical axis or cross-section Y perpendicular to the cross-section X and containing the optical axis, for the anamorphic lenses a1 and a2, respectively.

In order to have different conversion magnifications for the cross-section X and cross-section Y, there is the need to use what is known as a toric lens having different curvatures for the X cross-section and the Y cross-section, or use at least two cylindrical lenses having curvature for only one cross-section, thereby forming an afocal converter (anamorphic converter) with different angular magnifications for the X cross-section and the Y cross-section. Particularly, in order to satisfy the conditions of Expression (2) and prevent vignetting, βx>1 and βy>1 must hold. Accordingly, the anamorphic converter at the X cross-section or Y cross-section must be a tele-converter type with a positive-negative configuration from the object side.

As described above, with an arrangement wherein an anamorphic converter is disposed on the image side of the image-formation optical system as with the present embodiment, stipulating conditions for conversion magnification for the X and Y cross-sections containing the optical axis, and appropriately setting the lens configuration, enables realization of a built-in type anamorphic converter with excellent optical capabilities and no vignetting, optimal for digital cinematography in particular.

Second Embodiment

Figure 7:
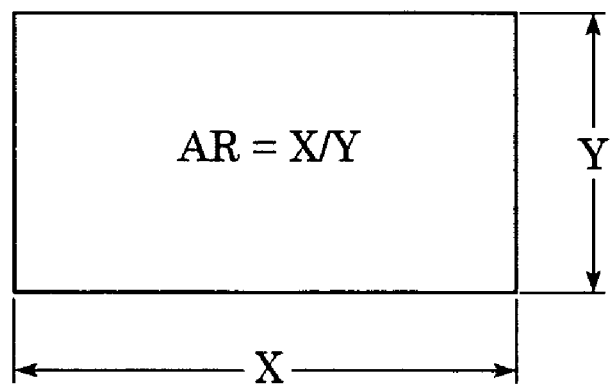
FIG. 7 is a conceptual diagram of aspect ratio, for describing a second embodiment of the present invention.
Figure 8:
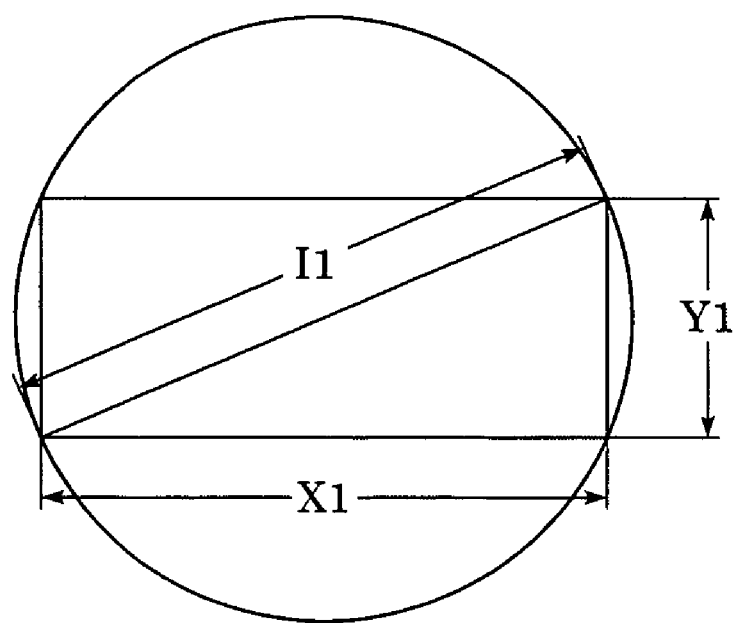
FIG. 8 is a conceptual diagram of an image circle and image-taking range in the field of an image-formation optical system according to the second embodiment of the present invention.
Figure 9:
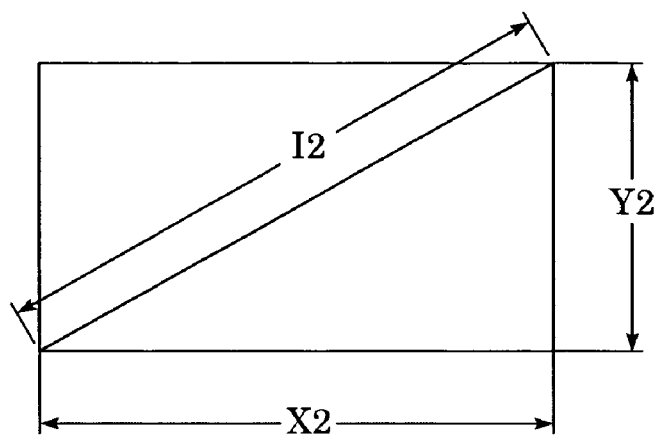
FIG. 9 is a conceptual diagram of an image circle and image-taking range following conversion by a converter, according to the second embodiment of the present invention.
Figure 10:
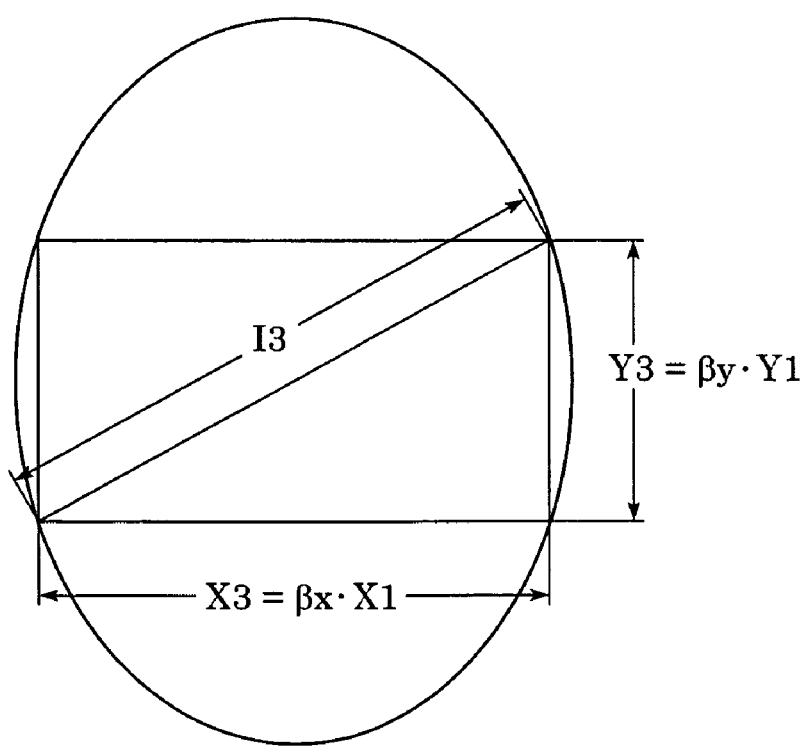
FIG. 10 is a conceptual diagram of the effective range of image-taking unit, according to the second embodiment of the present invention.
Figure 11:
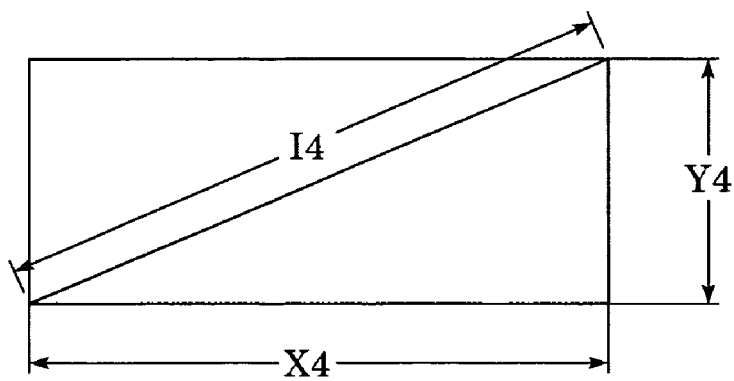
FIG. 11 is a conceptual diagram of the display region of the output image at the time of showing, according to the second embodiment of the present invention.
Figure 12A:
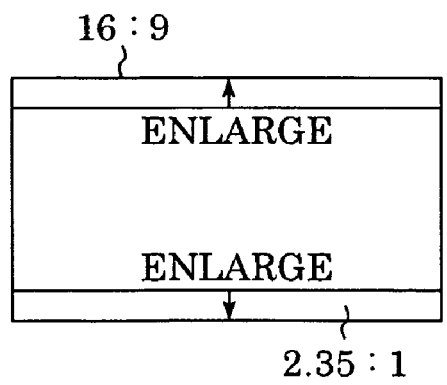
FIGS. 12A and 12B are conceptual diagrams for describing aspect ratio conversion methods according to the second embodiment of the present invention.
Figure 12B:
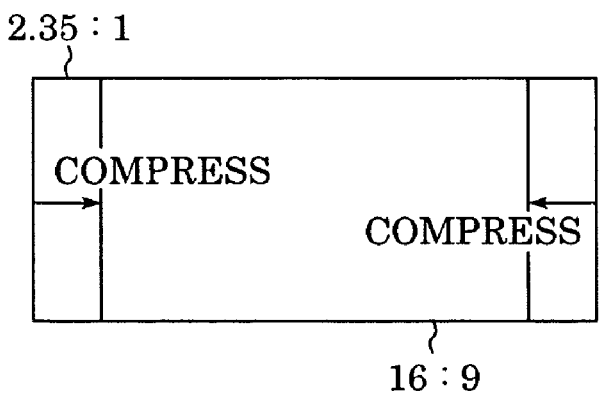

Next, as a second embodiment of the present invention, an anamorphic converter disposed on the object side of the image-formation optical system will be described. FIG. 7 is a conceptual diagram of aspect ratio, for describing the present embodiment, FIG. 8 is a conceptual diagram of an image circle and image-taking range in the field of an image-formation optical system according to the present embodiment, FIG. 9 is a conceptual diagram of an image circle and image-taking range following conversion by a converter, according to the present embodiment, FIG. 10 is a conceptual diagram of the effective range of image-taking unit, according to the present embodiment, FIG. 11 is a conceptual diagram of the display region of the output image at the time of showing, according to the present embodiment, and FIGS. 12A and 12B are conceptual diagrams for describing aspect ratio conversion methods according to the present embodiment.

With the anamorphic converter according to the present invention, the vertical direction can be enlarged to obtain the intended aspect ratio by setting the following conditions:

$$\phi a1 > 0 \qquad (1\text{—}1)$$

$$\phi a2 < 0 \qquad (1\text{-}2)$$

wherein the anamorphic converter has at least two anamorphic lenses a1 and a2 in that order from the object side, and wherein $\phi a1$ and $\phi a2$ represent the refractive power at an arbitrary cross-section X containing the optical axis or cross-section Y perpendicular to the cross-section X and containing the optical axis, for the anamorphic lenses a1 and a2, respectively.

Now, with the horizontal direction including the optical axis as cross-section X with reference to the image-taking screen as a reference, and a cross-section perpendicular to the cross-section X as a cross-section Y, in order to have different conversion magnifications for the cross-section X (horizontal direction) and cross-section Y (vertical direction), there is the need to use at least two cylindrical lenses or toric lenses, forming an afocal converter (anamorphic converter) with different angular magnifications for the X cross-section and the Y cross-section. Further, in order to realize an enlarging system for the cross-section Y direction alone, the anamorphic converter must be a tele-converter type with a positive-negative configuration from the object side of an anamorphic lens having positive power pal for the cross-section Y direction and an anamorphic lens having negative power $\phi a2$ for the cross-section Y direction.

Also, with the anamorphic converter disposed on the object side of the image-formation optical system according to the present embodiment, in the event of converting a picture with an aspect ratio of 2.35:1 into a picture with an aspect ratio of 16:9, there are two conceivable ways, one being the method for enlarging in the vertical direction as shown in FIG. 12A, and the other being the method for compressing in the horizontal direction as shown in FIG. 12B. Unlike the case wherein the anamorphic converter is disposed at the image side of the image-formation optical system, there is no vignetting with either method, but with the conventional techniques, a reduction system for compressing in the horizontal direction as shown in FIG. 12B requires that the field angle in the horizontal direction be ensured, resulting in the size of the anamorphic converter increasing. Also, the anamorphic converter has refractive power in the horizontal direction which is the longer dimensions of the effective screen, leading to deterioration of optical performance, such as deterioration in image-formation performance at the screen periphery, and distortion occurring. With the present invention, the vertical direction is enlarged as shown in FIG. 12A, so the anamorphic converter has refractive power in the vertical direction which is the shorter dimensions of the effective screen, thereby realizing a small and lightweight anamorphic converter wherein there is little deterioration of optical performance such as deterioration in image-formation performance at the screen periphery and distortion.

Also, with the anamorphic converter according to the present embodiment, suitable aspect ratio conversion can be performed by means of appropriately settings conditions as follows:

$$0.9 < (AR1 \cdot \beta x)/(AR2 \cdot \beta y) < 1.1 \qquad (2\text{-}1)$$

wherein βx represents the focal distance magnification scale at an arbitrary cross-section X containing the optical axis of the anamorphic converter, βy represents the focal distance magnification scale at a cross-section Y which is perpendicular to the cross-section X and contains the optical axis, AR1 represents the aspect ratio of the image-taking range in the field of the image-formation optical system, and AR2 represents the aspect ratio at the effective range of the image-taking unit disposed at the image side of the image-formation optical system. Expression (2-1) is the condition for executing suitable aspect ratio conversion.

With reference to FIG. 7, the aspect ratio AR is expressed as $$AR=X/Y \quad (3\text{-}1)$$

wherein X is the horizontal length of the field and Y is the vertical length of the field.

FIG. 8 is a model diagram of the imaging range of the image-formation optical system, and FIG. 9 is a model diagram of the imaging range of the imaging unit. With the horizontal length of effective screen dimensions of the imaging range in FIG. 8 for the field of the image-formation optical system as X1, the vertical length thereof as Y1, and the aspect ratio thereof as AR1, and further, with the horizontal length for the field of the imaging unit in FIG. 9 as X2, the vertical length thereof as Y2, and the aspect ratio thereof as AR2, the relation thereof is expressed as follows:

$$AR1/AR2=(X1\cdot Y2)/(X2\cdot Y1) \quad (4\text{-}1)$$

Also, FIG. 10 is a conceptual diagram of the imaging range following aspect ratio conversion with the anamorphic converter. In order for suitable aspect ratio conversion to be performed, the conversion magnification βx in the horizontal direction of the anamorphic converter and the conversion magnification βy in the vertical direction can be expressed as follows, $$\beta x=X2/X1 \quad (5\text{-}1)$$

$$\beta y=Y2/Y1 \quad (6\text{-}1)$$

According to Expressions (4-1) through (6-1), the condition for ideal aspect ratio conversion is as follows:

$$(AR1\cdot\beta x)/(AR2\cdot\beta y)=1 \quad (7\text{-}1)$$

In practice, a margin of error of about 10% is almost visually indiscernible, so suitable aspect ratio conversion can be realized by satisfying Expression (2-1).

FIG. 11 is a conceptual diagram of an output image at the time of showing. For projection, aspect ratio conversion opposite to that at the time of shooting must be performed, so as to return the aspect ratio to the original aspect ratio. Accordingly, the horizontal length X4 and vertical length Y4 in FIG. 11 can be respectively expressed by $$X4=\beta x'\cdot X2 \quad (8\text{-}1)$$

$$Y4=\beta y'\cdot Y2 \quad (9\text{-}1)$$

The conversion magnifications βx' and βy' can be respectively expressed by $$\beta x'=m/\beta x \quad (10\text{-}1)$$

$$\beta y'=m/\beta y \quad (11\text{-}1)$$

wherein m is an arbitrary constant.

As described above, with an arrangement wherein an anamorphic converter is disposed on the object side of the image-formation optical system as with the present embodiment, a front converter type anamorphic converter which is small and has high optical performance, optimal for digital cinematography in particular, can be realized by stipulating conditions for conversion magnification of cross-sections X and Y containing the optical axis, and setting the lens configuration appropriately.

First Embodiment

Now, embodiments of the present invention will be described. The configuration of a first embodiment of the present invention wherein an arrangement including an anamorphic converter disposed at the image side of the image-formation optical system is applied, will be described now.

Figure 1A:
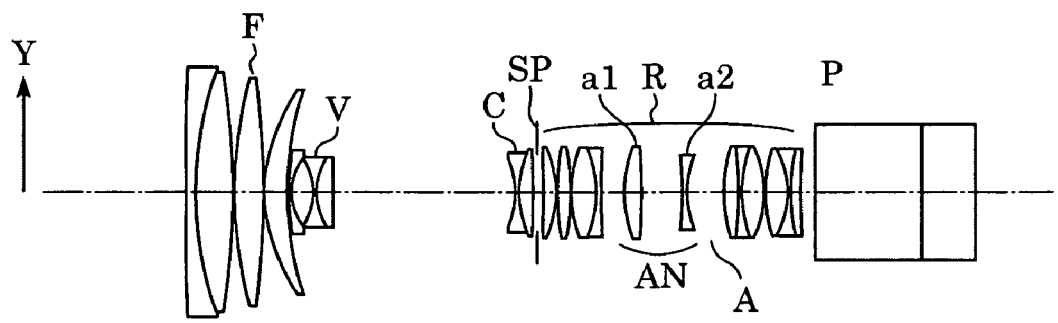
FIGS. 1A and 1B are diagrams illustrating a configuration of a first embodiment of the present invention.
Figure 1B:
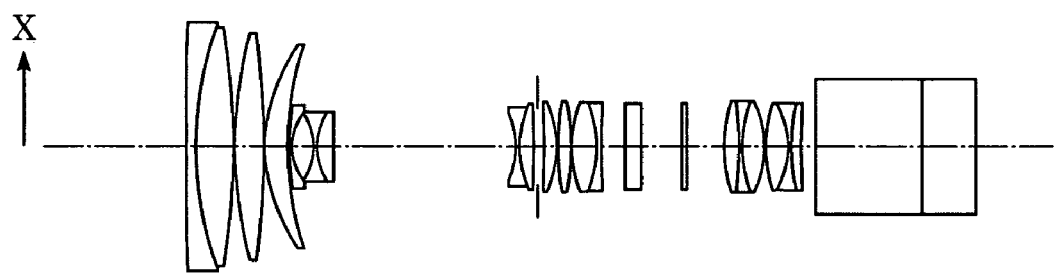
Figure 13:
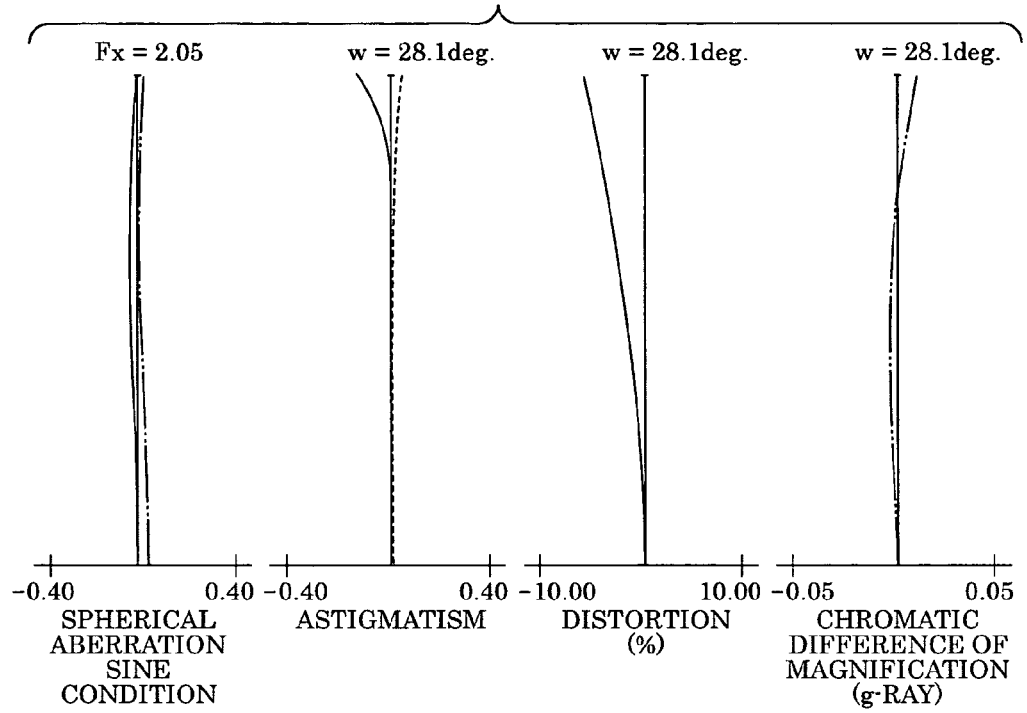
FIG. 13 is a diagram of longitudinal aberration in the X direction, in a numerical example according to the first embodiment wherein fx=10.3 mm, fy=13.6 mm, and object distance is 2.5 m.
Figure 14:
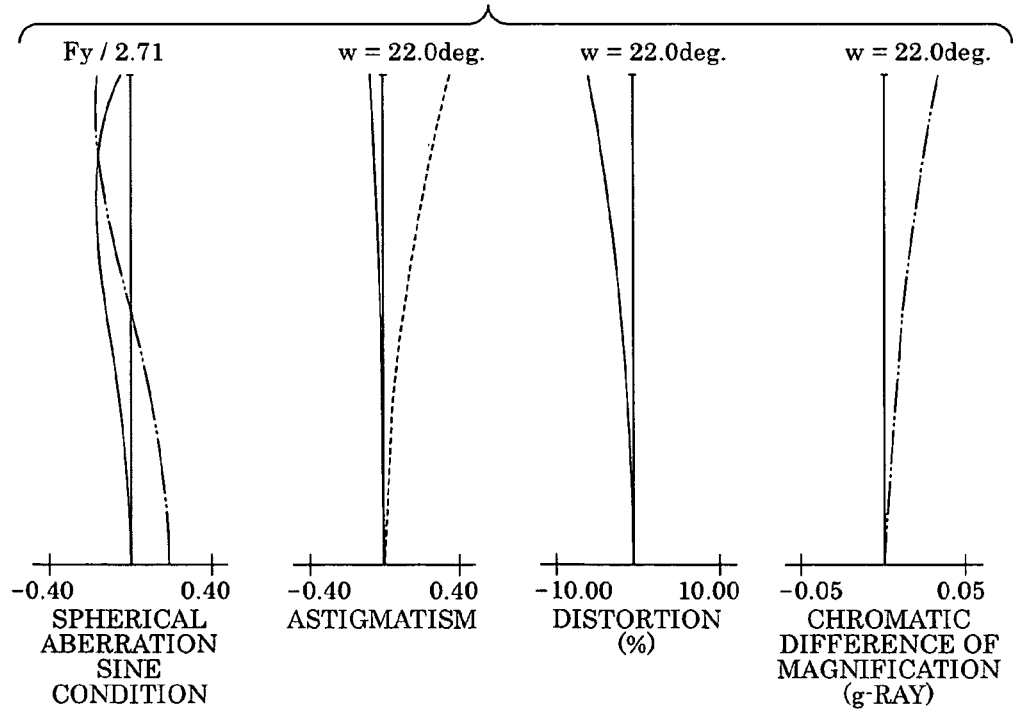
FIG. 14 is a diagram of longitudinal aberration in the Y direction, in a numerical example according to the first embodiment wherein fx=10.3 mm, fy=13.6 mm, and object distance is 2.5 m.
Figure 17:
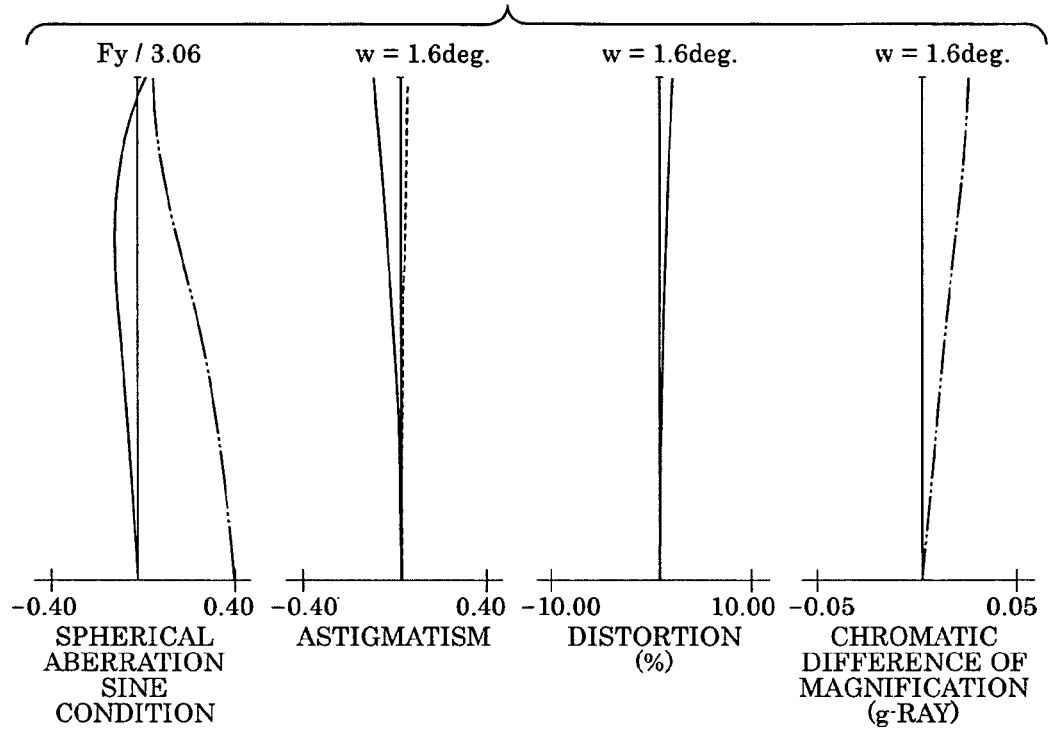
FIG. 17 is a diagram of longitudinal aberration in the X direction, in a numerical example according to the first embodiment wherein fx=151.1 mm, fy=199.7 mm, and object distance is 2.5 m.
Figure 18:
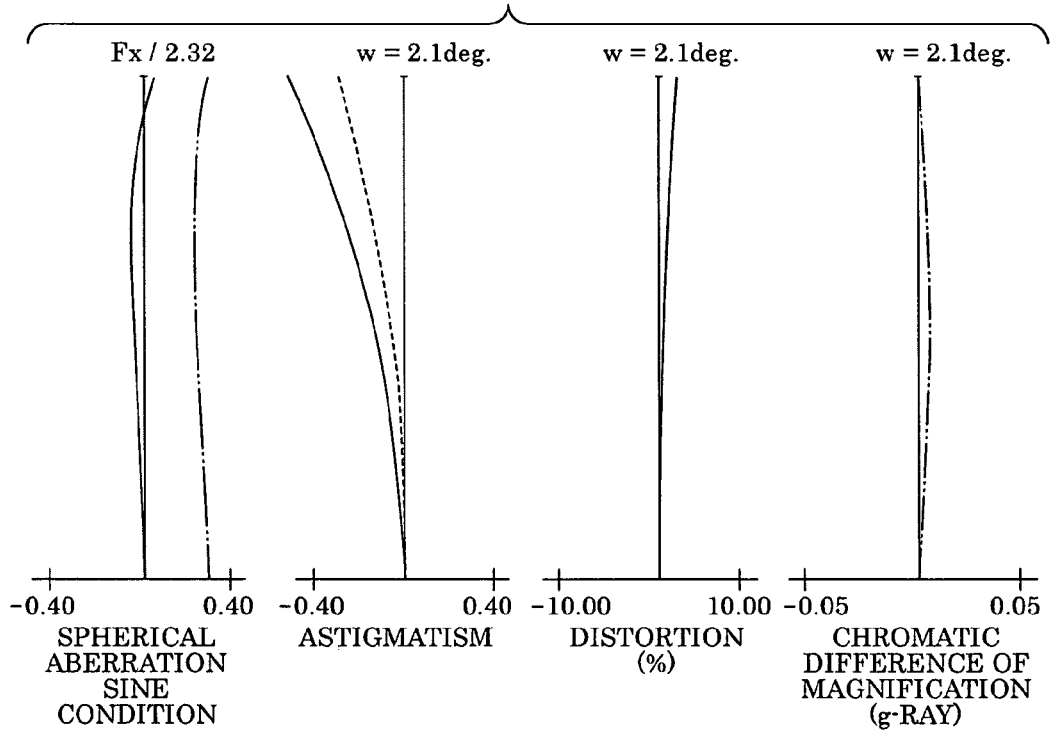
FIG. 18 is a diagram of longitudinal aberration in the Y direction, in a numerical example according to the first embodiment wherein fx=151.1 mm, fy=199.7 mm, and object distance is 2.5 m.

FIGS. 1A and 1B are diagrams illustrating the configuration of the first embodiment of the present invention. FIG. 1A is a cross-sectional diagram illustrating the lens configuration in the Y direction with an anamorphic converter inserted, and FIG. 1B is a cross-sectional diagram illustrating the lens configuration in the X direction with the anamorphic converter inserted. FIG. 13 is a diagram of longitudinal aberration in the X direction, in a numerical example according to the first embodiment wherein fx=10.3 mm, fy=13.6 mm, and object distance is 2.5 m. FIG. 14 is a diagram of longitudinal aberration in the Y direction, in a numerical example according to the first embodiment wherein fx=10.3 mm, fy=13.6 mm, and object distance is 2.5 m. FIG. 15 is a diagram of longitudinal aberration in the X direction, in a numerical example according to the first embodiment wherein fx=39.5 mm, fy=52.1 mm, and object distance is 2.5 m. FIG. 16 is a diagram of longitudinal aberration in the Y direction, in a numerical example according to the first embodiment wherein fx=39.5 mm, fy=52.1 mm, and object distance is 2.5 m. FIG. 17 is a diagram of longitudinal aberration in the X direction, in a numerical example according to the first embodiment wherein fx=151.1 mm, fy=199.7 mm, and object distance is 2.5 m. FIG. 18 is a diagram of longitudinal aberration in the Y direction, in a numerical example according to the first embodiment wherein fx=151.1 mm, fy=199.7 mm, and object distance is 2.5 m.

Figure 19:
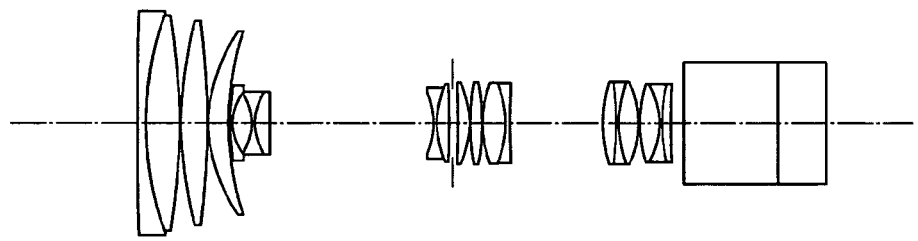
FIG. 19 is a cross-sectional diagram illustrating the lens configuration at the wide-angle end before inserting the anamorphic converter, according to the first embodiment.
Figure 20:
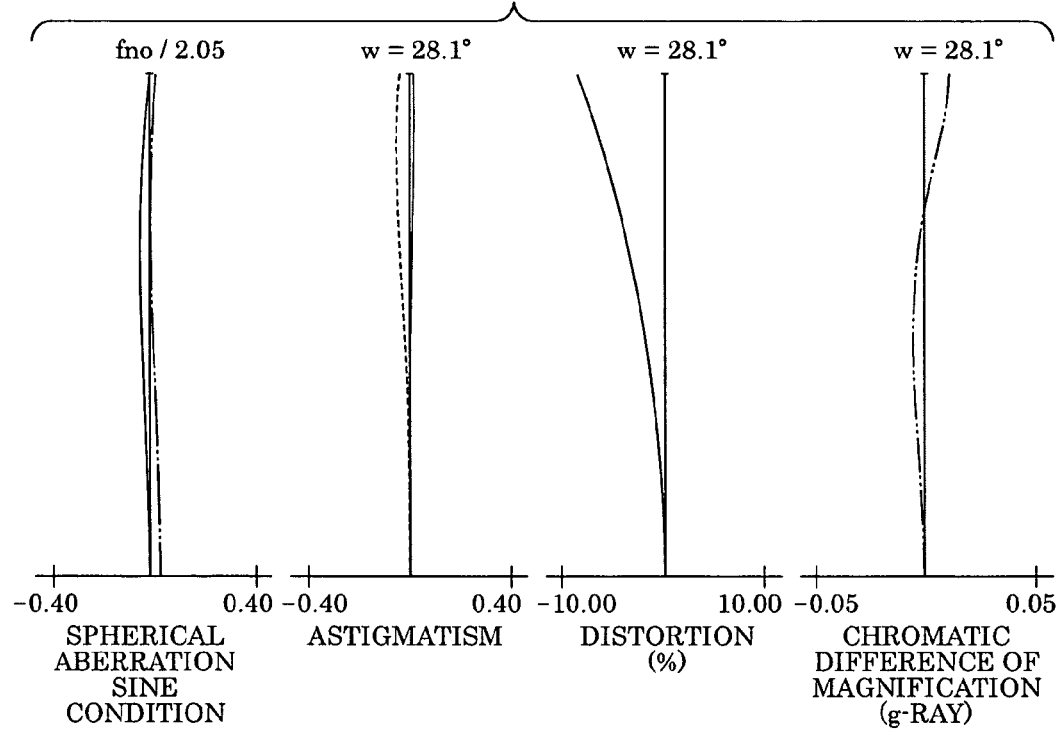
FIG. 20 is a diagram of longitudinal aberration in a numerical example according to the first embodiment before inserting the anamorphic converter, wherein f=10.3 mm, and object distance is 2.5 m.
Figure 21:
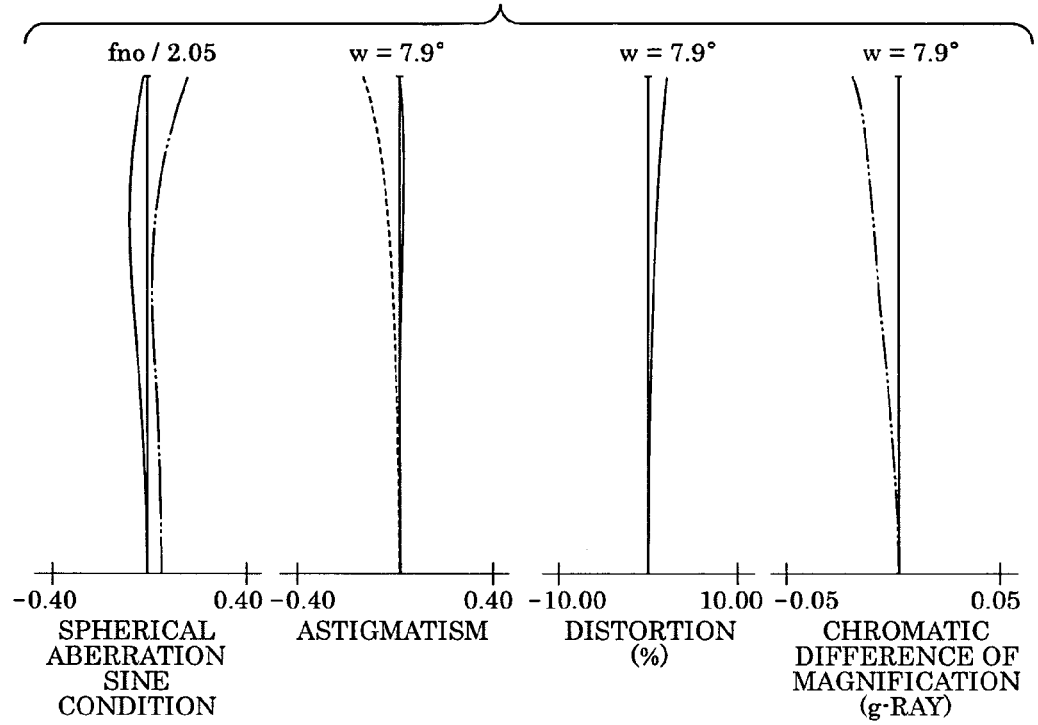
FIG. 21 is a diagram of longitudinal aberration in a numerical example according to the first embodiment before inserting the anamorphic converter, wherein f=39.5 mm, and object distance is 2.5 m.
Figure 22:
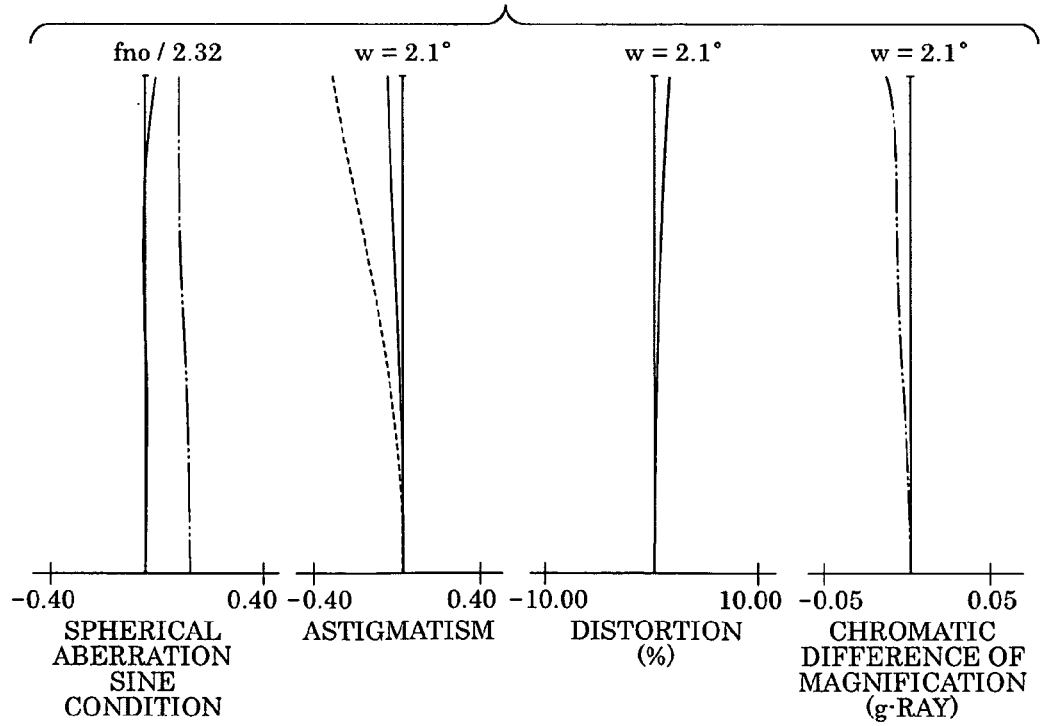
FIG. 22 is a diagram of longitudinal aberration in a numerical example according to the first embodiment before inserting the anamorphic converter, wherein f=151.1 mm, and object distance is 2.5 m.
Figure 23A:
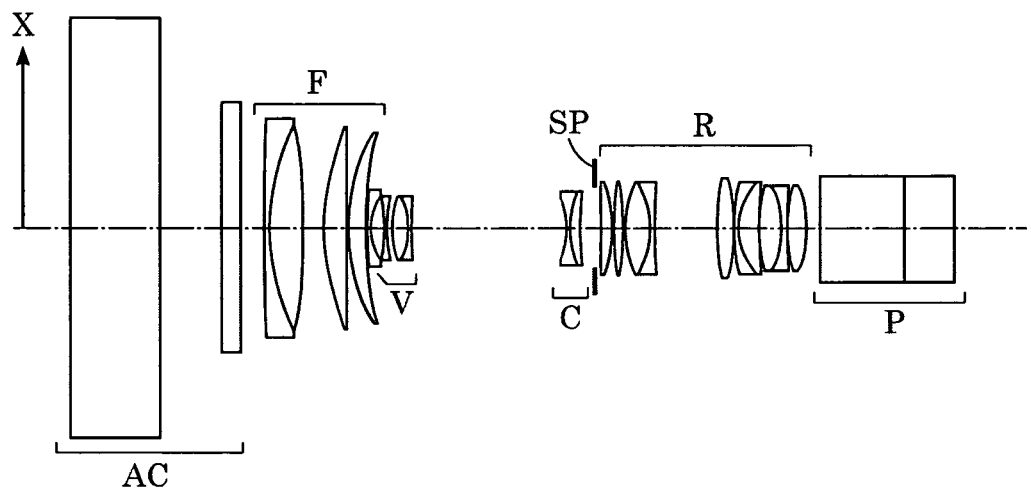
FIGS. 23A and 23B are diagrams illustrating the configuration of the second embodiment of the present invention.
Figure 23B:
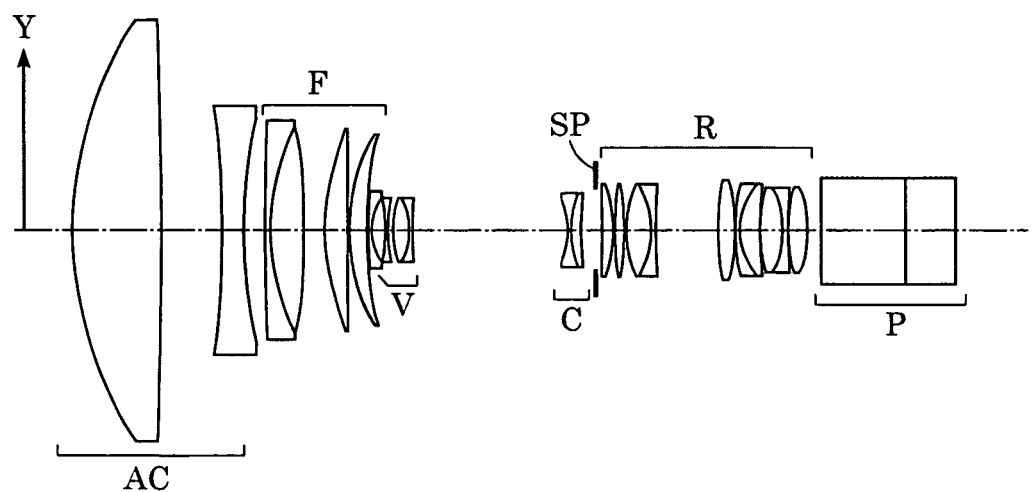

Further, FIG. 19 is a cross-sectional diagram illustrating the lens configuration at the wide-angle end before inserting the anamorphic converter, according to the first embodiment. FIG. 20 is a diagram of longitudinal aberration in a numerical example according to the first embodiment before inserting the anamorphic converter, wherein f=10.3 mm, and object distance is 2.5 m. FIG. 21 is a diagram of longitudinal aberration in a numerical example according to the first embodiment before inserting the anamorphic converter, wherein f=39.5 mm, and object distance is 2.5 m. FIG. 22 is a diagram of longitudinal aberration in a numerical example according to the first embodiment before inserting the anamorphic converter, wherein f=151.1 mm, and object distance is 2.5 m. FIGS. 23A and 23B are diagrams illustrating the configuration of a second embodiment of the present invention. FIG. 23A is a cross-sectional diagram illustrating the lens configuration in the X direction with an anamorphic converter inserted, and FIG. 23B being a cross-sectional diagram illustrating the lens configuration in the Y direction with the anamorphic converter inserted.

In FIGS. 1A and 1B, reference character F denotes a front lens group for positive refractive power serving as a first group. Reference character V denotes a variator for negative refractive power for variable magnification, serving as a second group, which changes magnification from wide-angle to telephoto by simply moving along the optical axis to the field side. Reference character C is a compensator for negative refractive power, serving as a third group, and non-linearly moves on the optical axis to the object side following a convex track, in order to correct image shifting accompanying variation of magnification. The variator V and compensator C make up the magnification variation system. Further, reference character SP denotes the aperture (stop) and R denotes a relay group serving as a fourth group for fixed positive refractive power in variable magnification. Preference character P denotes a color separation prism or optical filter or the like, illustrated as a glass block in FIG. 1.

With the present embodiment, a device including the first through fourth groups is defined as a lens device, a device having a color separation prism or optical filter and imaging device disposed closer to the object side from the fourth group is defined as a camera device, and a device having the lens device and camera device such that the lens device and camera device are capable of being detachably mounted is defined as an image-taking device.

Next, the features of the fourth group according to the present embodiment will be described. The fourth group has a generally afocal space A, with the anamorphic converter AN removably inserted in the space A. The anamorphic converter AN is configured of two cylindrical lenses a1 and a2, with each cylindrical lens having zero curvature in the X direction, only curvature in the Y direction. The Y-directional refractive power φa1 and φa2 of the cylindrical lenses a1 and a2 is $$\phi a1 = +0.0162$$

and $$\phi a2 = -0.0214$$

respectively, satisfying the conditions of Expressions (3) and (4).

The aspect ratio AR1 of the imaging range of the field of the image-formation optical system and the aspect ratio AR2 of the effecting range of the imaging unit are $$AR1=2.35 \quad (18)$$

$$AR2=1.78 \quad (19)$$

The conversion magnification βx in the X direction and the conversion magnification βy in the Y direction are $$\beta x=1.0 \quad (20)$$

$$\beta y=1.32 \quad (21)$$

Accordingly, the values of the conditional expressions are $$(AR1 \cdot \beta x)/(AR2 \cdot \beta y)=1.00 \quad (22)$$

$$(AR2^2+1) \cdot \beta y^2/(AR1^2+1)=1.11 \quad (23)$$

thereby satisfying the conditions of Expressions (1) and (2), thus realizing a built-in converter type anamorphic converter with excellent optical properties and no vignetting.

The following shows numerical examples according to the present embodiment.

TABLE 1

Numerical Examples according to the First Embodiment
fx = 10.3~151.1
fy = 13.6~199.7    fno = 1: 2.05~2.32    2w = 56.2 deg.~4.2 deg.

| | | | |
|---|---|---|---|
| r1 = 1169.481 | d1 = 2.40 | n1 = 1.81265 | v1 = 25.4 |
| r2 = 98.429 | d2 = 10.83 | n2 = 1.51825 | v2 = 64.2 |
| r3 = 265.170 | d3 = 0.20 | | |
| r4 = 124.037 | d4 = 8.29 | n3 = 1.60548 | v3 = 60.7 |
| r5 = −281.395 | d5 = 0.20 | | |
| r6 = 51.797 | d6 = 6.46 | n4 = 1.64254 | v4 = 60.1 |
| r7 = 97.915 | d7 = variable | | |

TABLE 1-continued

Numerical Examples according to the First Embodiment
fx = 10.3~151.1
fy = 13.6~199.7    fno = 1: 2.05~2.32    2w = 56.2 deg.~4.2 deg.

| | | | |
|---|---|---|---|
| r8 = 71.045 | d8 = 0.90 | n5 = 1.82017 | v5 = 46.6 |
| r9 = 17.601 | d9 = 6.01 | | |
| r10 = −21.542 | d10 = 0.90 | n6 = 1.77621 | v6 = 49.6 |
| r11 = 18.397 | d11 = 4.63 | n7 = 1.85501 | v7 = 23.9 |
| r12 = −4295.134 | d12 = variable | | |
| r13 = 27.245 | d13 = 0.90 | n8 = 1.79013 | v8 = 44.2 |
| r14 = 31.613 | d14 = 3.84 | n9 = 1.85501 | v9 = 23.9 |
| r15 = 1125.345 | d15 = variable | | |
| r16 = 0.000(aperture) | d16 = 1.60 | | |
| r17 = 10000.000 | d17 = 4.02 | n10 = 1.73234 | v10 = 54.7 |
| r18 = −32.342 | d18 = 0.20 | | |
| r19 = 107.938 | d19 = 3.60 | n11 = 1.48915 | v11 = 70.2 |
| r20 = 121.402 | d20 = 0.20 | | |
| r21 = 37.891 | d21 = 7.17 | n12 = 1.48915 | v12 = 70.2 |
| r22 = 36.452 | d22 = 1.20 | n13 = 1.83932 | v13 = 37.2 |
| r23 = 177.431 | d23 = 7.00 | | |
| r24 = 44.041 | d24 = 4.62 | n14 = 1.60548 | v14 = 60.6 |
| r25 = −238.800 | d25 = 11.67 | | |
| r26 = −868.640 | d26 = 1.50 | n15 = 1.60718 | v15 = 38.0 |
| r27 = 29.333 | d27 = 10.21 | | |
| r28 = 48.564 | d28 = 4.26 | n16 = 1.48915 | v16 = 70.2 |
| r29 = 193.706 | d29 = 0.20 | | |
| r30 = −210.911 | d30 = 1.20 | n17 = 1.83932 | v17 = 37.2 |
| r31 = 39.960 | d31 = 6.49 | n18 = 1.48915 | v18 = 70.2 |
| r32 = 33.683 | d32 = 0.20 | | |
| r33 = 43.464 | d33 = 6.21 | n19 = 1.53430 | v19 = 48.8 |
| r34 = −30.063 | d34 = 1.20 | n20 = 1.80811 | v20 = 46.6 |
| r35 = 113.246 | d35 = 0.20 | | |
| r36 = 56.783 | d36 = 2.98 | n21 = 1.55098 | v21 = 45.8 |
| r37 = −10000.000 | d37 = 3.80 | | |
| r38 = 0.000 | d38 = 30.00 | n22 = 1.60718 | v22 = 38.0 |
| r39 = 0.000 | d39 = 16.20 | n23 = 1.51825 | v23 = 64.2 |
| r40 = 0.000 | | | |

Note:
r24 through r27 are cylindrical lenses with an X-direction curvature radius of zero.

TABLE 2

| | Focal distance varying space | | |
|---|---|---|---|
| | fx10.3 | 39.5 | 151.1 |
| | fy13.6 | 52.1 | 199.7 |
| d7 | 0.39 | 33.92 | 49.55 |
| d12 | 52.91 | 14.80 | 3.78 |
| d15 | 1.55 | 6.13 | 1.53 |

Second Embodiment

Now, the configuration of a second embodiment of the present invention wherein an arrangement including an anamorphic converter disposed at the object side of the image-formation optical system is applied, will be described.

Figure 24:
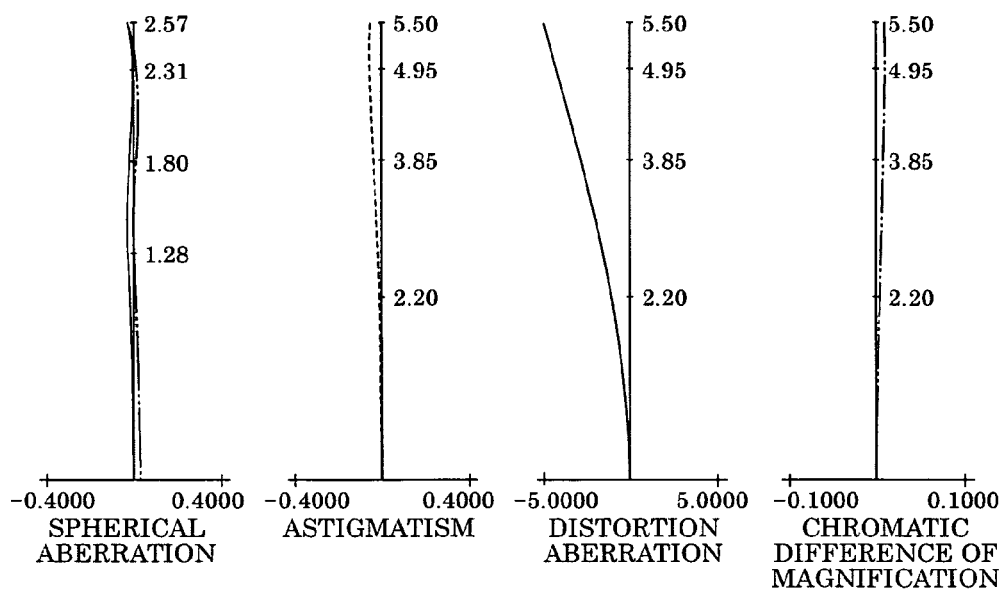
FIG. 24 is a diagram of longitudinal aberration in the X direction at the wide angle end in a numerical example according to the second embodiment, wherein object distance is at infinity.
Figure 25:
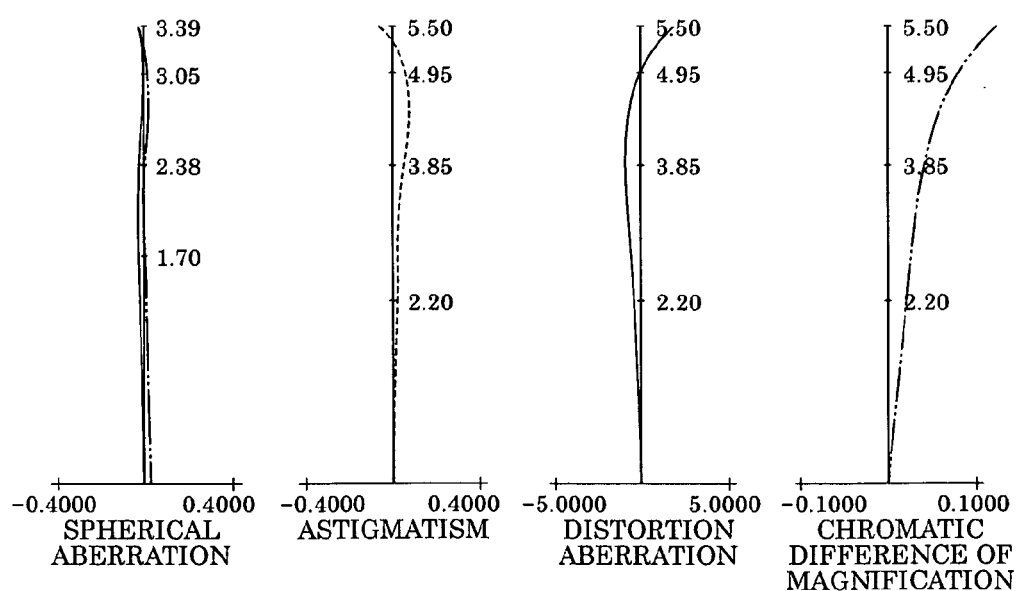
FIG. 25 is a diagram of longitudinal aberration in the Y direction at the wide angle end in a numerical example according to the second embodiment, wherein object distance is at infinity.
Figure 26:
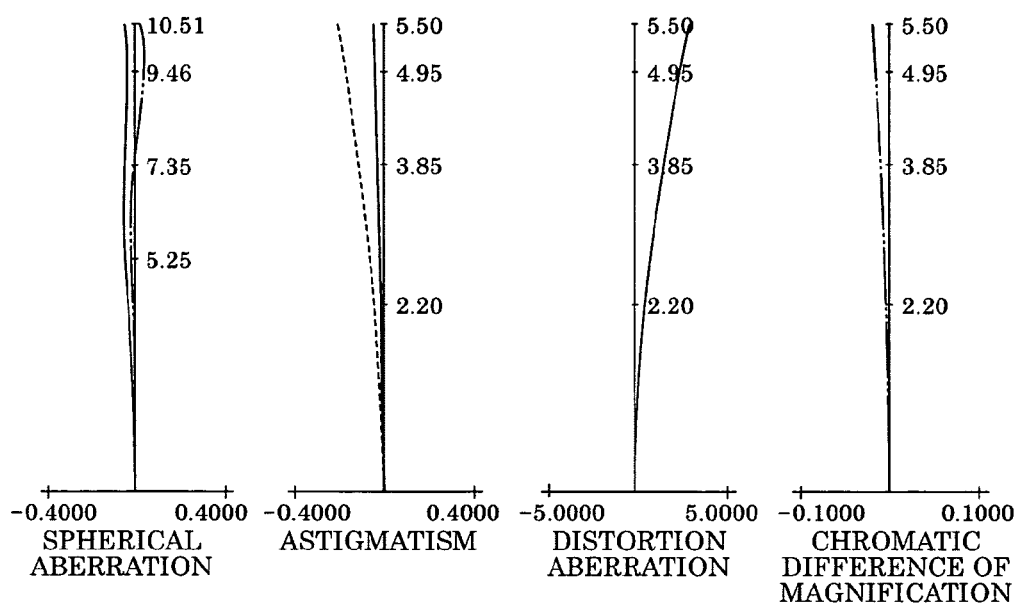
FIG. 26 is a diagram of longitudinal aberration in the X direction in a numerical example according to the second embodiment, wherein fx=38.85 mm, fy=51.36 mm, and object distance is at infinity.
Figure 27:
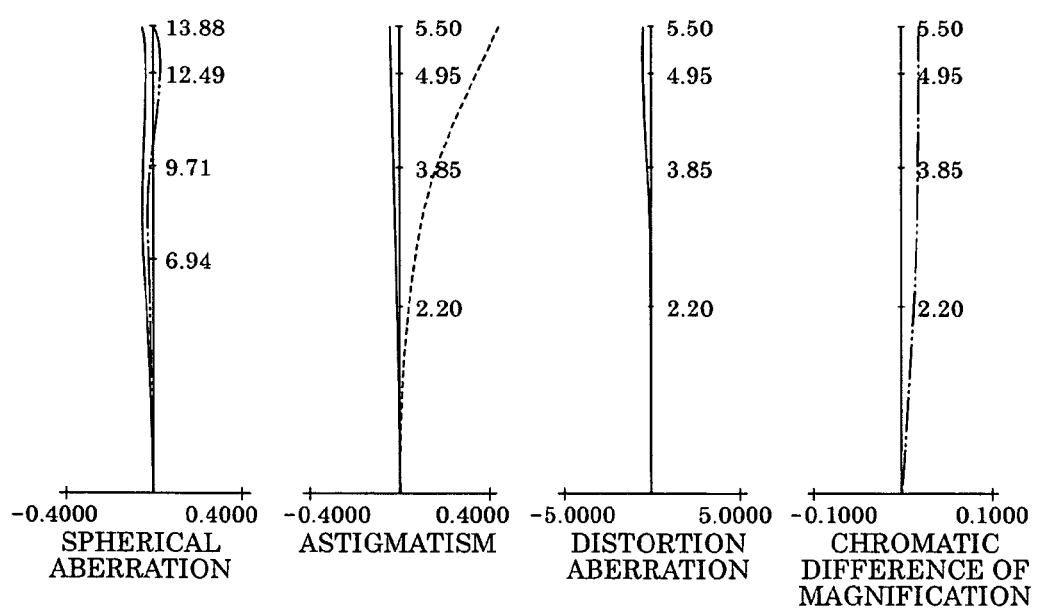
FIG. 27 is a diagram of longitudinal aberration in the Y direction in a numerical example according to the second embodiment, wherein fx=38.85 mm, fy=51.36 mm, and object distance is at infinity.
Figure 28:
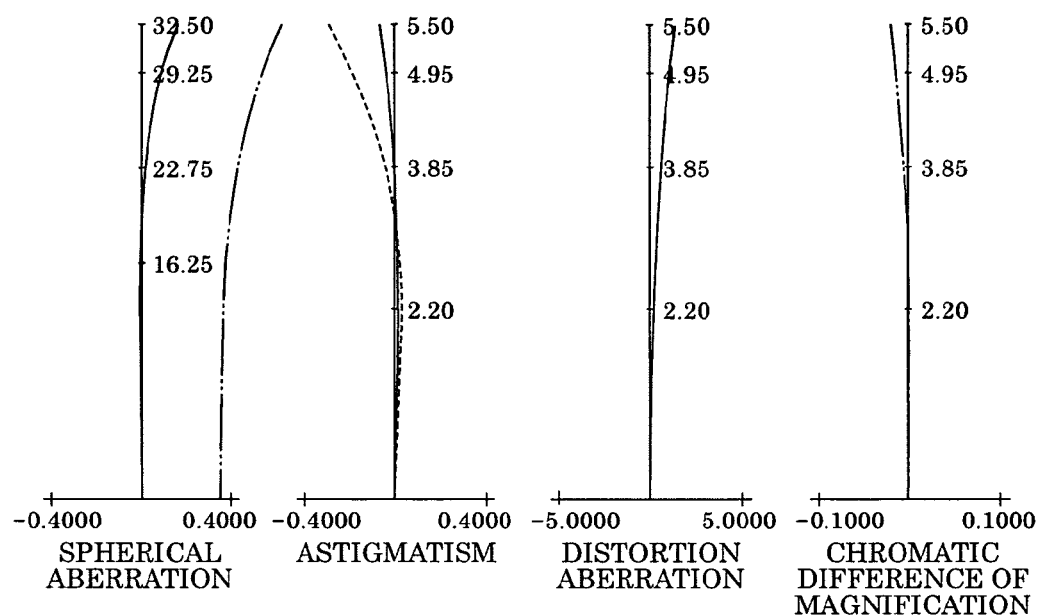
FIG. 28 is a diagram of longitudinal aberration in the X direction at the telephoto angle end in a numerical example according to the second embodiment, wherein object distance is at infinity.
Figure 29:
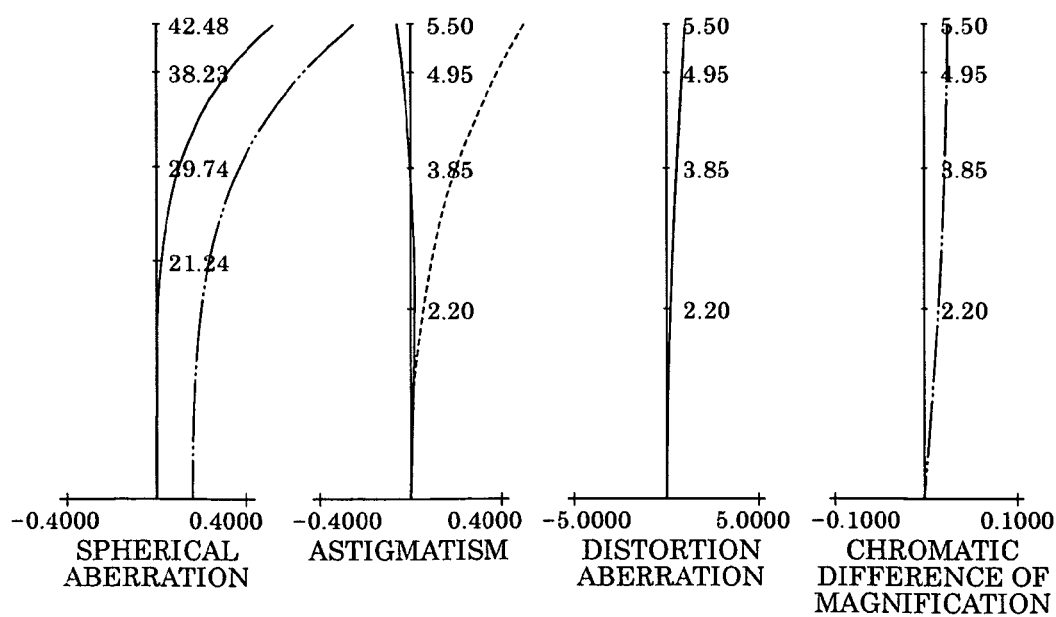
FIG. 29 is a diagram of longitudinal aberration in the Y direction at the telephoto end in a numerical example according to the second embodiment, wherein object distance is at infinity.

FIGS. 23A and 23B are diagrams illustrating the configuration of a second embodiment of the present invention. FIG. 23A is a cross-sectional diagram illustrating the lens configuration in the X direction with an anamorphic converter inserted, and FIG. 23B is a cross-sectional diagram illustrating the lens configuration in the Y direction with the anamorphic converter inserted. FIG. 24 is a diagram of longitudinal aberration in the X direction at the wide angle end in a numerical example according to the second embodiment, wherein object distance is at infinity. FIG. 25 is a diagram of longitudinal aberration in the Y direction at the wide angle end in a numerical example according to the second embodiment, wherein object distance is at infinity. FIG. 26 is a diagram of longitudinal aberration in the X direction in a numerical example according to the second embodiment, wherein fx=38.85 mm, fy=51.36 mm, and object distance is at infinity. FIG. 27 is a diagram of longitudinal aberration in the Y direction in a numerical example according to the second embodiment, wherein fx=38.85 mm, fy=51.36 mm, and object distance is at infinity. FIG. 28 is a diagram of longitudinal aberration in the X direction at the telephoto angle end in a numerical example according to the second embodiment, wherein object distance is at infinity. FIG. 29 is a diagram of longitudinal aberration in the Y direction at the telephoto end in a numerical example according to the second embodiment, wherein object distance is at infinity.

Figure 30:
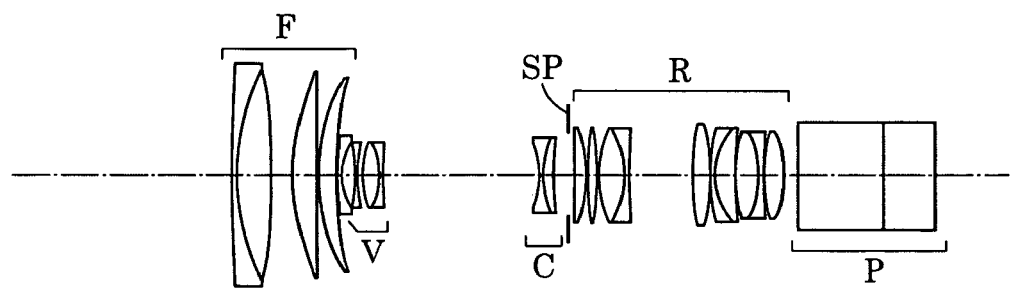
FIG. 30 is a cross-sectional diagram illustrating the lens configuration at the wide-angle end before inserting the anamorphic converter, according to the second embodiment.
Figure 31:
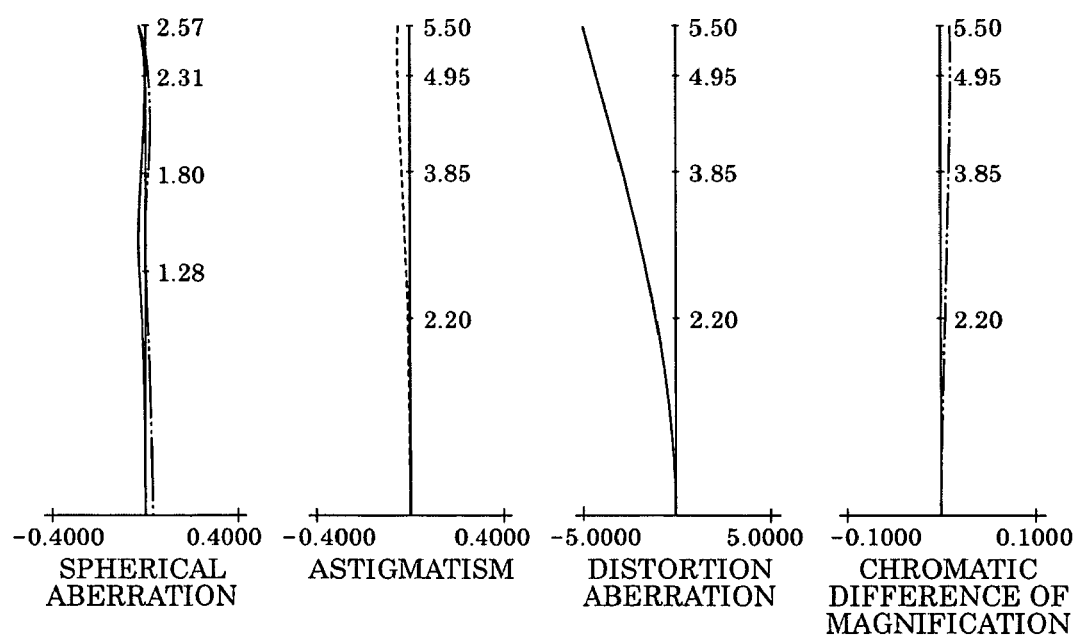
FIG. 31 is a diagram of longitudinal aberration at the wide angle end in a numerical example according to the second embodiment, wherein object distance of the image-formation optical system is at infinity.
Figure 32:
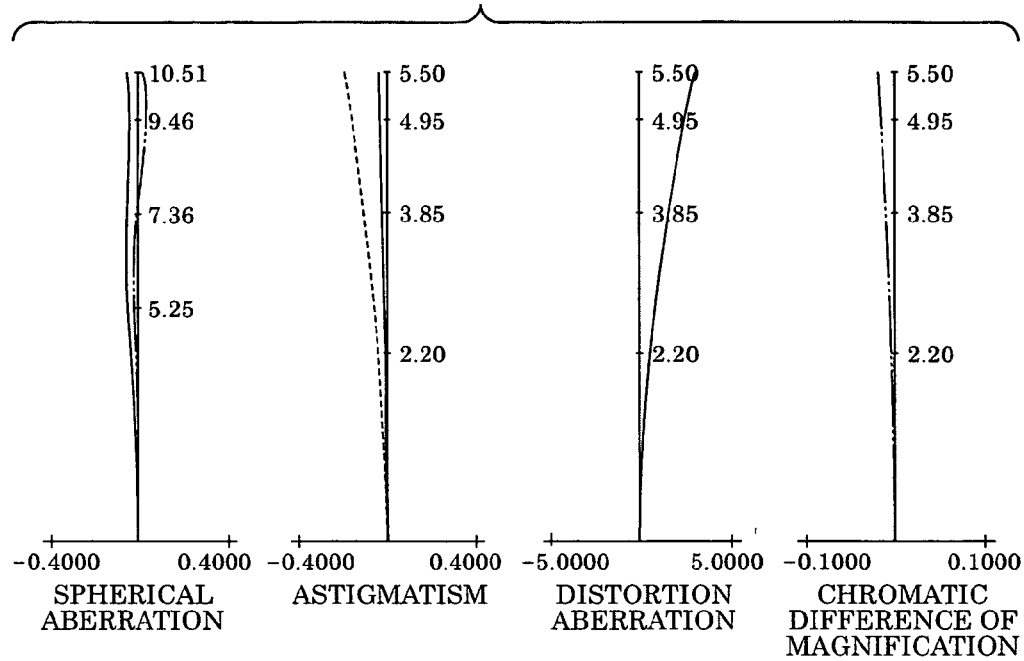
FIG. 32 is a diagram of longitudinal aberration in a numerical example according to the second embodiment, wherein f=38.85 mm, wherein object distance of the image-formation optical system is at infinity.
Figure 33:
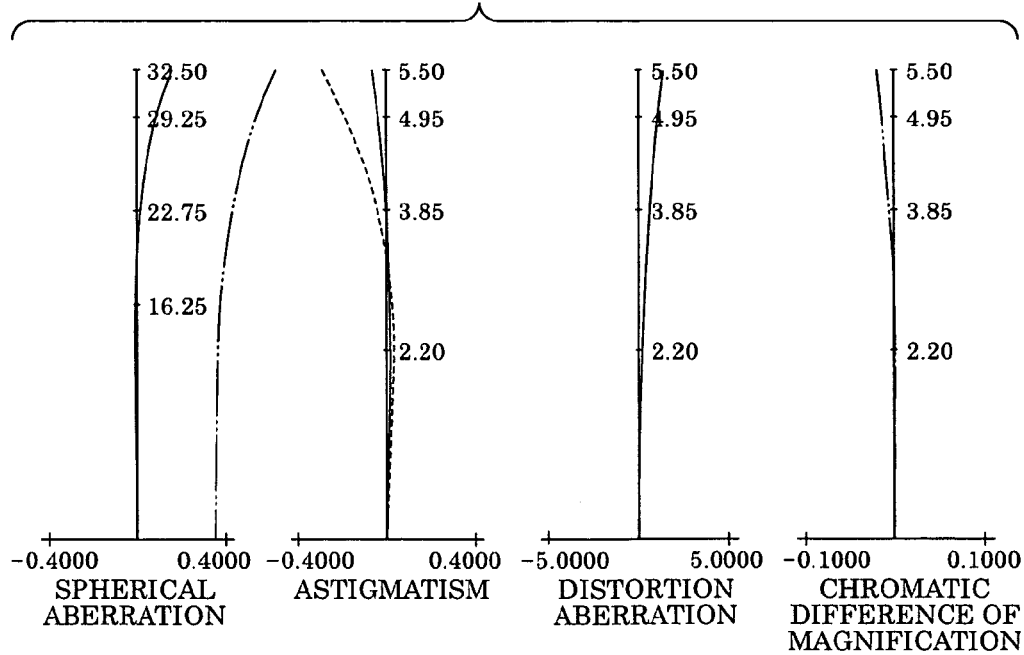
FIG. 33 is a diagram of longitudinal aberration at the telephoto end in a numerical example according to the second embodiment, wherein object distance of the image-formation optical system is at infinity.

Further, FIG. 30 is a cross-sectional diagram illustrating the lens configuration at the wide-angle end before inserting the anamorphic converter, according to the second embodiment. FIG. 31 is a diagram of longitudinal aberration at the wide angle end in a numerical example according to the second embodiment, wherein object distance of the image-formation optical system is at infinity. FIG. 32 is a diagram of longitudinal aberration in a numerical example according to the second embodiment, wherein f=38.85 mm. FIG. 33 is a diagram of longitudinal aberration at the telephoto end in a numerical example according to the second embodiment, wherein object distance of the image-formation optical system is at infinity.

In FIGS. 23A and 23B, reference character F denotes a front lens group for positive refractive power, serving as a first group. Reference character V denotes a variator for negative refractive power for variable magnification, serving as a second group, which changes magnification from wide-angle to telephoto by simply moving along the optical axis to the field side. Reference character C is a compensator for negative refractive power, serving as a third group, and non-linearly moves on the optical axis to the object side following a convex track, in order to correct image shifting accompanying variation of magnification. The variator V and compensator C make up the magnification variation system. Further, reference character SP denotes the aperture (stop) and R denotes a relay group serving as a fourth group for fixed positive refractive power in variable magnification. Preference character P denotes a color separation prism or optical filter or the like, illustrated as a glass block in FIG. 23A. Reference character AC denotes the anamorphic converter according to the present invention.

With the present embodiment, a device including the first through fourth groups is defined as a lens device, a device having a color separation prism or optical filter and imaging device disposed closer to the object side from the fourth group is defined as a camera device, and a device having the lens device and camera device such that the lens device and camera device are capable of being detachably mounted is defined as an image-taking device.

The anamorphic converter AC according to the present invention as shown in FIGS. 23A and 23B uses two cylindrical lenses having refractive power only in the cross-section Y direction, forming an afocal converter (anamorphic converter) having different magnifications at the cross-section X and the cross-section Y. Further, in order for only the cross-section Y direction to be an enlarging system, a tele-converter configuration is used wherein a cylindrical lens having positive power $\phi a1$ in the cross-section Y direction and a cylindrical lens having negative power $\phi a2$ in the cross-section Y direction are disposed in order from the object side, as indicated in the numerical examples of the present embodiment.

The aspect ratio AR1 of the imaging range of the field of the image-formation optical system and the aspect ratio AR2 of the effecting range of the imaging unit are $$AR1=2.35 \quad (12\text{-}1)$$

$$AR2=1.78 \quad (13\text{-}1)$$

The conversion magnification $\beta x$ in the X direction and the conversion magnification $\beta y$ in the Y direction are $$\beta x=1.0 \quad (14\text{-}1)$$

$$\beta y=1.32 \quad (15\text{-}1)$$

Accordingly, $$(AR1 \cdot \beta x)/(AR2 \cdot \beta y)=1.00 \quad (16\text{-}1)$$

thereby satisfying the conditions of Expression (2), thus realizing a small front converter type anamorphic converter with excellent optical properties.

TABLE 3

Numerical Examples according to the Second Embodiment
fx = 9.50~185.25, fy = 12.56~244.88
Fx = 1.85~2.85, Fy = 2.45~3.77
2ωx = 53.6°~3.0°, 2ωy = 24.2°~1.3°

| | | | |
|---|---|---|---|
| r1 = 128.300 | d1 = 30.87 | n1 = 1.74795 | ν1 = 44.8 |
| r2 = 7592.181 | d2 = 21.07 | | |
| r3 = −394.954 | d3 = 6.81 | n2 = 1.83932 | ν2 = 37.2 |
| r4 = 148.466 | d4 = 7.00 | | |
| r5 = 600.261 | d5 = 2.20 | n3 = 1.76168 | ν3 = 27.5 |
| r6 = 81.461 | d6 = 11.42 | n4 = 1.49845 | ν4 = 81.6 |
| r7 = −290.956 | d7 = 7.63 | | |
| r8 = 86.701 | d8 = 7.86 | n5 = 1.62287 | ν5 = 60.3 |
| r9 = 3044.710 | d9 = 0.15 | | |
| r10 = 66.016 | d10 = 6.01 | n6 = 1.73234 | ν6 = 54.7 |
| r11 = 145.708 | d11 = variable | | |
| r12 = 111.445 | d12 = 0.80 | n7 = 1.88814 | ν7 = 40.8 |
| r13 = 16.812 | d13 = 4.65 | | |
| r14 = −47.842 | d14 = 0.70 | n8 = 1.82017 | ν8 = 46.6 |
| r15 = 33.779 | d15 = 2.24 | | |
| r16 = 28.944 | d16 = 5.20 | n9 = 1.81264 | ν9 = 25.4 |
| r17 = −29.192 | d17 = 0.54 | | |
| r18 = −24.664 | d18 = 0.70 | n10 = 1.79196 | ν10 = 47.4 |
| r19 = 132.572 | d19 = variable | | |
| r20 = 28.806 | d20 = 0.75 | n11 = 1.74679 | ν11 = 49.3 |
| r21 = 37.218 | d21 = 3.81 | n12 = 1.85501 | ν12 = 23.9 |
| r22 = 449.023(aperture) | d22 = variable | | |
| | d22 = 1.80 | | |
| r23 = 0.000 | d23 = 3.79 | n13 = 1.72793 | ν13 = 38.0 |
| r24 = 46.584 | d24 = 0.20 | | |
| r25 = 166.701 | d25 = 3.92 | n14 = 1.51314 | ν14 = 60.5 |
| r26 = −63.568 | d26 = 0.20 | | |
| r27 = 42.160 | d27 = 8.34 | n15 = 1.48915 | ν15 = 70.2 |
| r28 = −33.917 | d28 = 1.66 | n16 = 1.83932 | ν16 = 37.2 |
| r29 = 172.175 | d29 = 21.27 | | |
| r30 = 111.436 | d30 = 6.19 | n17 = 1.50349 | ν17 = 56.4 |
| r31 = −44.823 | d31 = 0.20 | | |
| r32 = 82.661 | d32 = 1.40 | n18 = 1.83932 | ν18 = 37.2 |
| r33 = 20.646 | d33 = 7.09 | n19 = 1.50349 | ν19 = 56.4 |
| r34 = 284.915 | d34 = 0.20 | | |
| r35 = 60.636 | d35 = 7.53 | n20 = 1.51825 | ν20 = 64.2 |
| r36 = −24.607 | d36 = 1.40 | n21 = 1.80811 | ν21 = 46.6 |
| r37 = 105.806 | d37 = 0.30 | | |
| r38 = 44.171 | d38 = 6.68 | n22 = 1.50349 | ν22 = 56.4 |
| r39 = −37.129 | d39 = 5.00 | | |
| r40 = 0.000 | d40 = 30.00 | n23 = 1.60718 | ν23 = 38.0 |
| r41 = 0.000 | d41 = 16.20 | n24 = 1.51825 | ν24 = 64.2 |
| r42 = 0.000 | | | |

TABLE 3-continued

Numerical Examples according to the Second Embodiment
fx = 9.50~185.25, fy = 12.56~244.88
Fx = 1.85~2.85, Fy = 2.45~3.77
2ωx = 53.6°~3.0°, 2ωy = 24.2°~1.3°

Note:
r1 through r4 are cylindrical lenses making up the anamorphic converter according to the present invention, having an X-direction curvature radius of zero.

TABLE 4

| | Focal distance Fx | | |
|---|---|---|---|
| | 9.50 | 38.85 | 185.25 |
| | Focal distance Fy | | |
| | 12.56 | 51.36 | 244.88 |
| d11 | 0.65 | 36.96 | 52.03 |
| d19 | 53.75 | 13.38 | 6.32 |
| d22 | 5.10 | 10.15 | 1.15 |

TABLE 5

| φa1 | 0.0059 |
|---|---|
| φa2 | −0.0078 |

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-027496 filed Feb. 4, 2004, which is hereby incorporated by reference herein.

What is claimed is:

1. An anamorphic converter which can be inserted into and removed from a lens group of an image-formation optical system, the anamorphic converter comprising:

an anamorphic lens satisfying the following conditions:

$$0.9 < (AR1 \cdot \beta x)/(AR2 \cdot \beta y) < 1.1$$

$$(AR2^2+1) \cdot \beta y^2/(AR1^2+1) > 1$$

wherein βx represents a first focal distance magnification scale at a first cross-section containing an optical axis of the anamorphic lens, wherein βy represents a second focal distance magnification scale at a second cross-section which is perpendicular to the first cross-section and contains the optical axis, wherein AR1 represents an aspect ratio of an image-taking range in a field of the image-formation optical system, wherein AR2 represents an aspect ratio at an effective range of an image-taking unit disposed at an object side of the lens group, wherein the anamorphic lens includes at least two anamorphic lenses at and a1 and a2 positioned in order from an image side, and satisfying the following conditions:

$$\phi a1 > 0$$

$$\phi a2 < 0, \text{ and}$$

wherein φa1 and φa2 represent refractive flowers of the anamorphic lenses at and a1 and a2, respectively, at least one of the first cross-section and the second cross-section.

2. A lens device comprising:

an image-formation optical system including, in order from an object side,
  a first lens group configured to facilitate positive refractive power focusing;
  a second lens group configured to facilitate negative refractive power focusing to allow for variable magnification;
  a third lens group configured to facilitate correcting image shift due to changing magnification;
  a fourth lens group configured to facilitate fixed positive refractive power focusing to allow for variable magnification; and
  the anamorphic converter according to claim 1 disposed within the fourth lens group.

3. An image-taking device comprising:
the lens device according to claim 2; and
an image-taking unit mounted to the lens device.

4. A lens device comprising:

an image-formation optical system including, in order from an object side,
  a first lens group configured to facilitate positive refractive power focusing;
  a second lens group configured to facilitate negative refractive power focusing to allow for variable magnification;
  a third lens group configured to facilitate correcting image shift due to changing magnification;
  a fourth lens group configured to facilitate fixed positive refractive power focusing to allow for variable magnification; and
  the anamorphic converter according to claim 1 disposed within the fourth lens group.

5. An anamorphic converter disposed at an object side of an image-formation optical system, comprising at least two anamorphic lenses a1 and a2 positioned in order from the object side, wherein the two anamorphic lenses a1 and a2 satisfying the following conditions:

$$\phi a1 > 0$$

$$\phi a2 < 0$$

wherein φa1 and φa2 represent refractive powers of the anamorphic lens a1 and the anamorphic lens a2, at a first cross-section containing an optical axis of the anamorphic lenses and perpendicular to a second cross-section containing the optical axis.

6. The anamorphic converter according to claim 5, wherein the anamorphic lenses satisfy the following condition:

$$0.9 < (AR1 \cdot \beta x)/(AR2 \cdot \beta y) < 1.1$$

wherein βx represents a focal distance magnification scale at the second cross-section;
wherein βy represents a focal distance magnification scale at the first cross-section;
wherein AR1 represents an aspect ratio of an image-taking range in a field of the image-formation optical system, and wherein AR2 represents an aspect ratio at an effective range of an image-taking unit disposed at the object side of the image-formation optical system.

7. A lens device comprising:

an image-formation optical system including, in order from an object side, a first lens group configured to facilitate positive refractive power focusing;

a second lens group configured to facilitate negative refractive power focusing to allow for variable magnification;

a third lens group configured to facilitate correcting image shift due to changing magnification;

a fourth lens group configured to facilitate fixed positive refractive power focusing to allow for variable magnification; and the anamorphic converter according to claim 6 disposed closer to the object side than the first lens group.

8. A lens device comprising:

an image-formation optical system including, in order from an object side, a first lens group configured to facilitate positive refractive power focusing;

a second lens group configured to facilitate negative refractive power focusing to allow for variable magnification;

a third lens group configured to facilitate correcting image shift due to changing magnification;

a fourth lens group configured to facilitate fixed positive refractive power focusing to allow for variable magnification; and the anamorphic converter according to claim 5 disposed closer to the object side than the first lens group.

9. An image-taking device comprising:

the lens device according to claim 8; and an image-taking unit mounted to the lens device.

* * * * *